US010169659B1

(12) United States Patent
Pearson et al.

(10) Patent No.: US 10,169,659 B1
(45) Date of Patent: Jan. 1, 2019

(54) VIDEO SUMMARIZATION USING SELECTED CHARACTERISTICS

(71) Applicant: Amazon Technologies, Inc., Seattle, WA (US)

(72) Inventors: Mark Eugene Pearson, Mercer Island, WA (US); Dynin Hong Khem, Houston, TX (US); Peter Van Tuyl Bentley, Seattle, WA (US); William Christopher Banta, Lafayette, CA (US); Kevin Michael Gordon, Seattle, WA (US); Manlio Armando Lo Conte, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/863,705

(22) Filed: Sep. 24, 2015

(51) Int. Cl.
*H04N 5/93* (2006.01)
*G06K 9/00* (2006.01)
*G06K 9/52* (2006.01)
*G06T 7/60* (2017.01)
*G06T 7/20* (2017.01)
*G11B 27/02* (2006.01)
*G11B 27/30* (2006.01)
*G10L 25/78* (2013.01)
*G10L 25/81* (2013.01)

(52) U.S. Cl.
CPC ..... *G06K 9/00751* (2013.01); *G06K 9/00288* (2013.01); *G06K 9/00476* (2013.01); *G06K 9/00718* (2013.01); *G06K 9/00765* (2013.01); *G06K 9/52* (2013.01); *G06T 7/20* (2013.01); *G06T 7/60* (2013.01); *G10L 25/78* (2013.01); *G10L 25/81* (2013.01); *G11B 27/02* (2013.01); *G11B 27/3081* (2013.01)

(58) Field of Classification Search
CPC ... G11B 27/034; G11B 2220/90; G11B 27/34; G11B 27/105; H04N 9/8042
USPC ........................................................ 386/278
See application file for complete search history.

(56) References Cited

U.S. PATENT DOCUMENTS

| | | | | |
|---|---|---|---|---|
| 8,649,573 | B1* | 2/2014 | Darbari | G06K 9/00751 382/118 |
| 2009/0097816 | A1* | 4/2009 | Nakate | G11B 27/28 386/278 |
| 2012/0038766 | A1* | 2/2012 | Park | G08B 13/19671 348/143 |
| 2012/0276513 | A1* | 11/2012 | Ayers | G09B 5/067 434/310 |
| 2013/0071088 | A1* | 3/2013 | Waikhom | H04N 5/2621 386/241 |

(Continued)

*Primary Examiner* — Loi H Tran
(74) *Attorney, Agent, or Firm* — Pierce Atwood LLP

(57) ABSTRACT

Devices, systems and methods are disclosed for improving a playback of video data and generation of a video summary. For example, annotation data may be generated for individual video frames included in the video data to indicate content present in the individual video frames, such as faces, objects, pets, speech or the like. A video summary may be determined by calculating a priority metric for individual video frames based on the annotation data. In response to input indicating a face and a period of time, a video summary can be generated including video segments focused on the face within the period of time. The video summary may be directed to multiple faces and/or objects based on the annotation data.

18 Claims, 23 Drawing Sheets

(56) References Cited

U.S. PATENT DOCUMENTS

| | | | |
|---|---|---|---|
| 2015/0221343 A1* | 8/2015 | Yamaji | G06F 17/30831 386/241 |
| 2015/0286719 A1* | 10/2015 | Sampathkumaran | G06F 17/30831 707/772 |
| 2016/0014482 A1* | 1/2016 | Chen | G11B 27/031 386/241 |
| 2016/0092561 A1* | 3/2016 | Liu | G06F 17/30843 386/230 |
| 2016/0210998 A1* | 7/2016 | Leske | G06T 11/60 |
| 2017/0054779 A1* | 2/2017 | Ehmann | H04L 65/602 |

\* cited by examiner

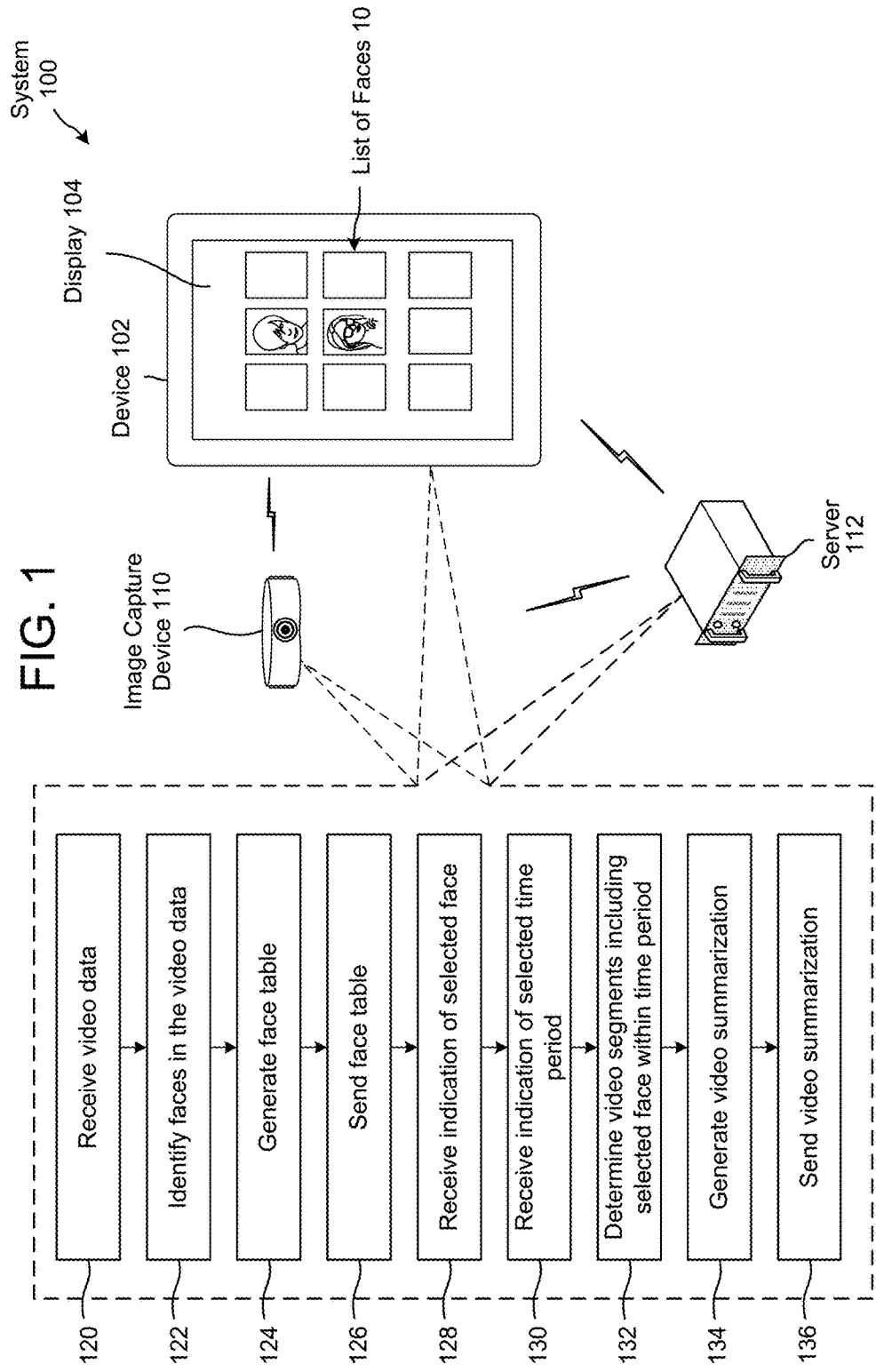

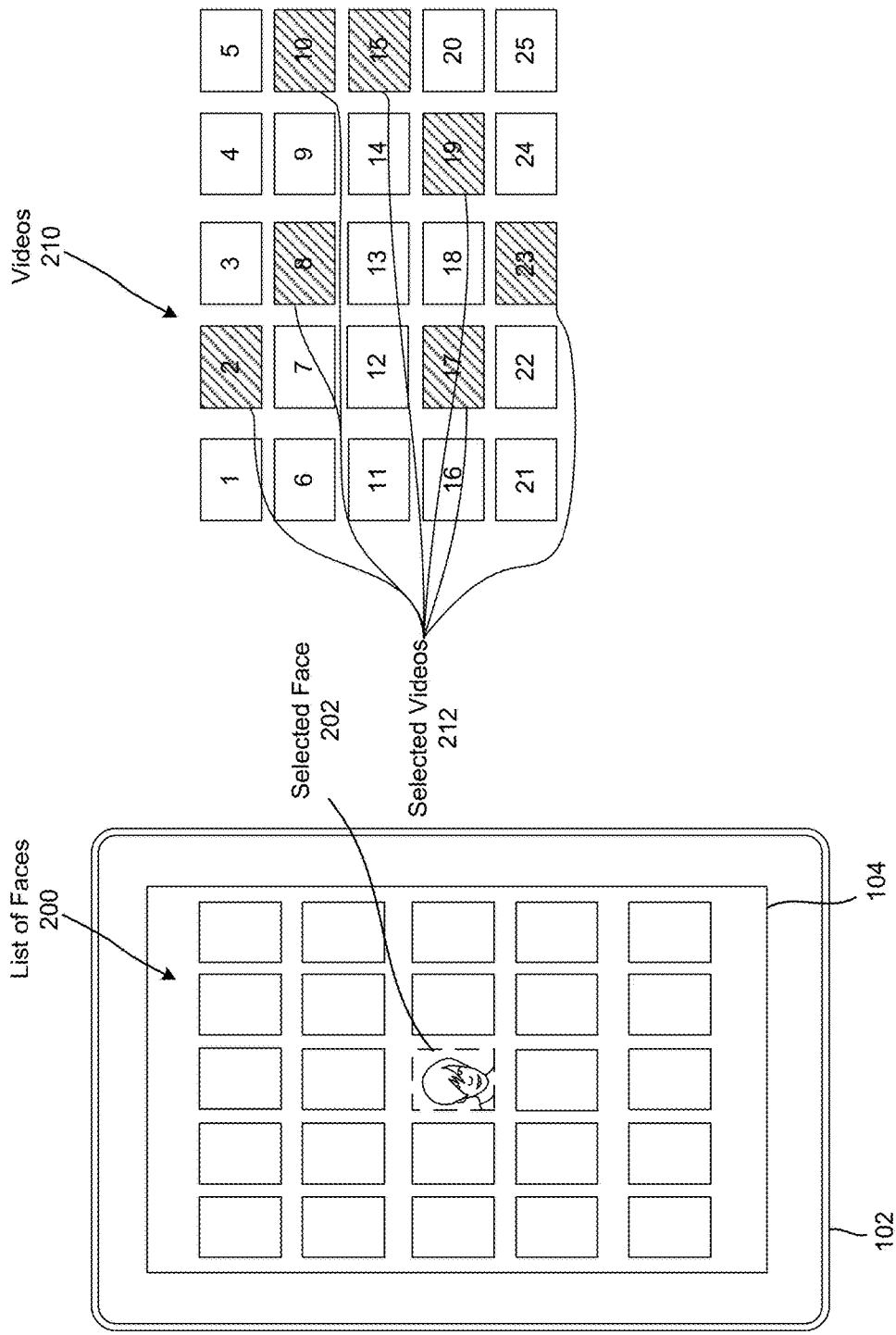

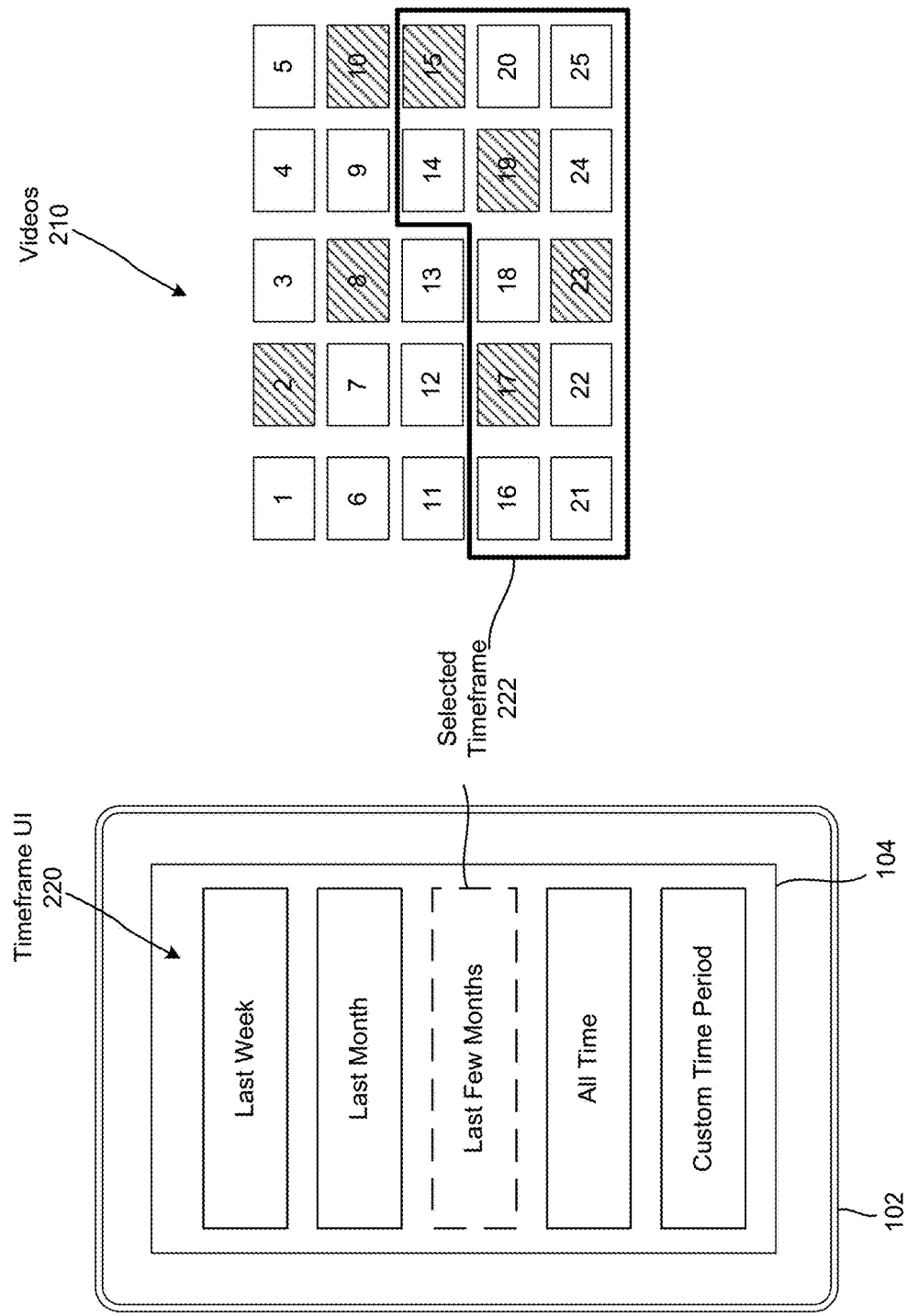

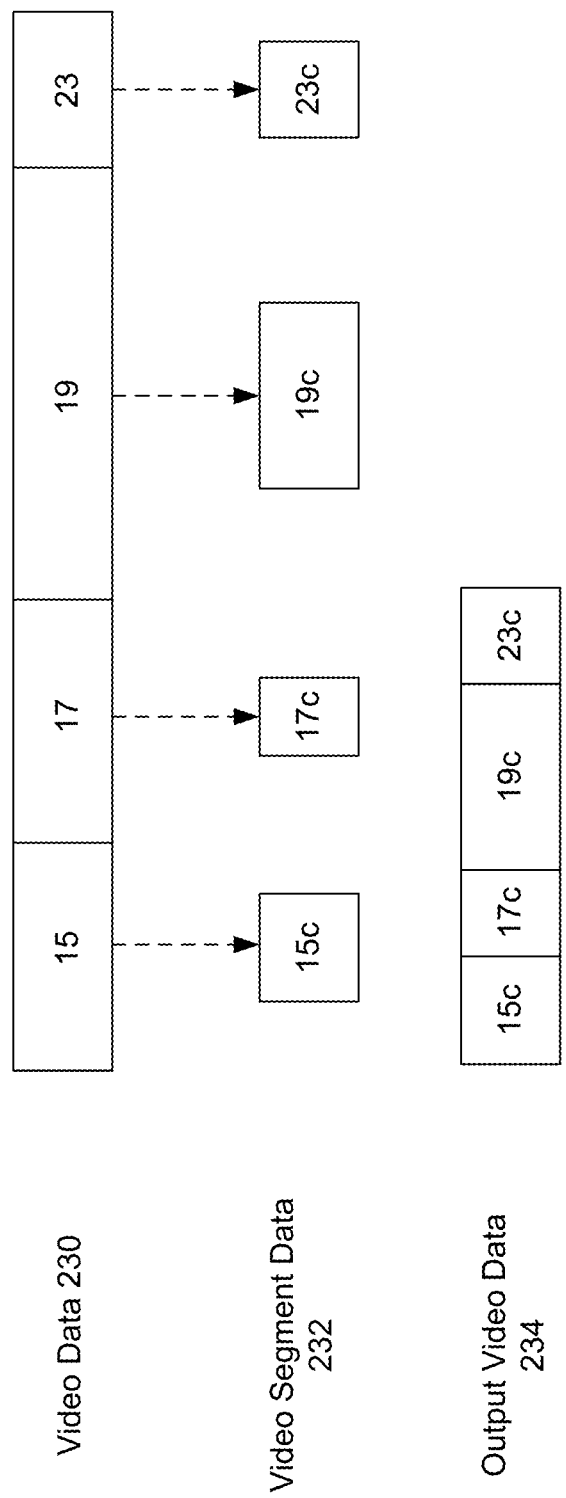

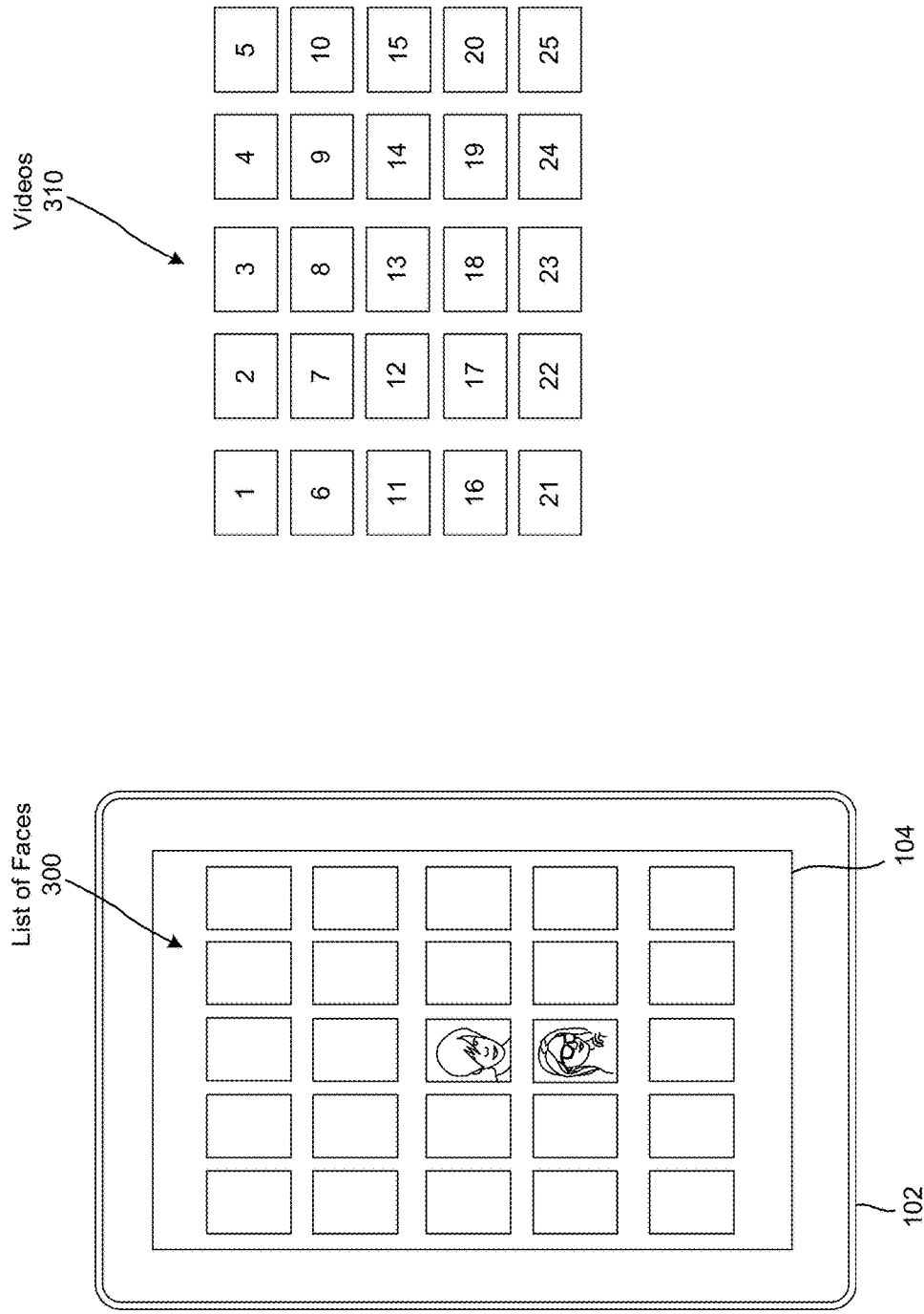

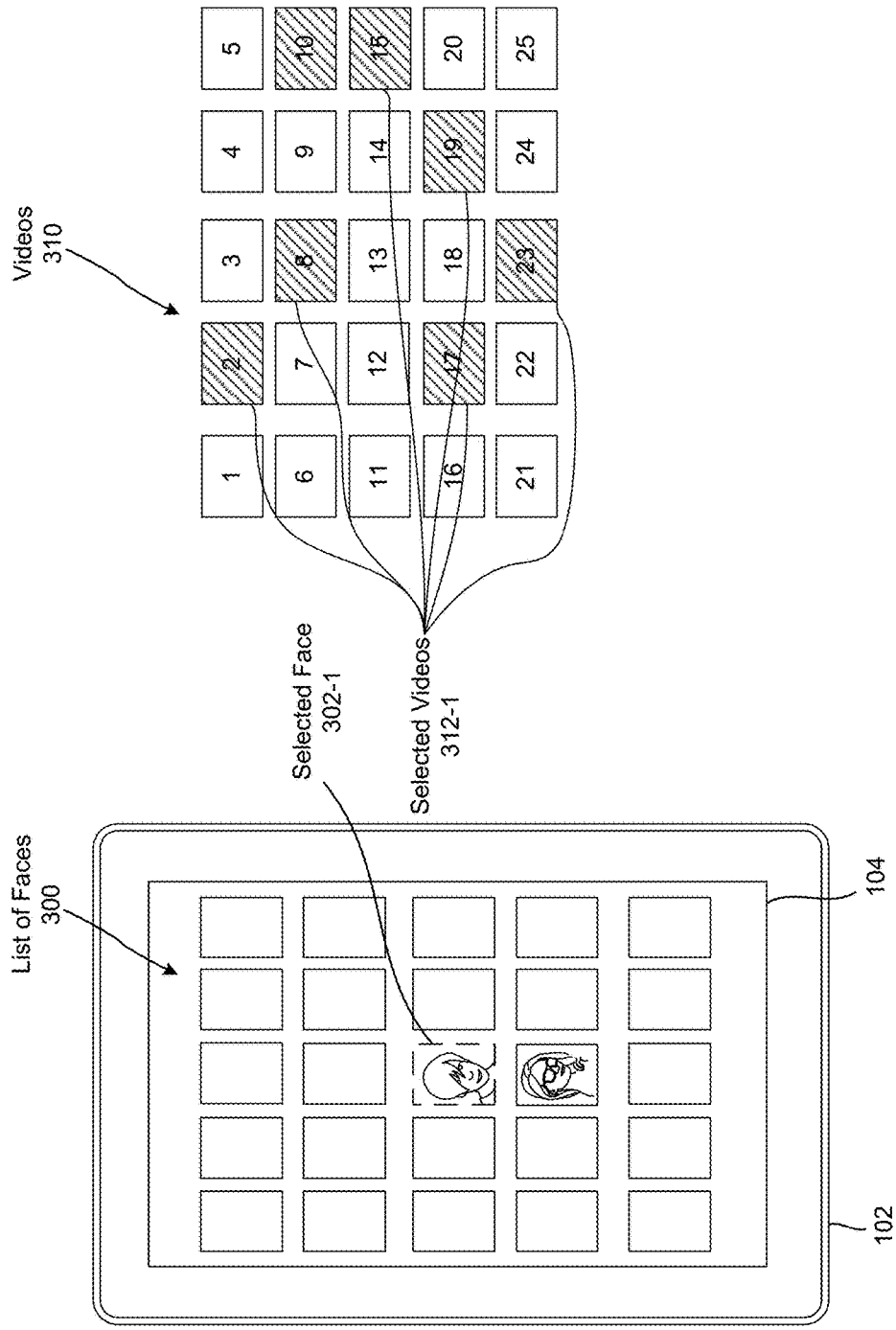

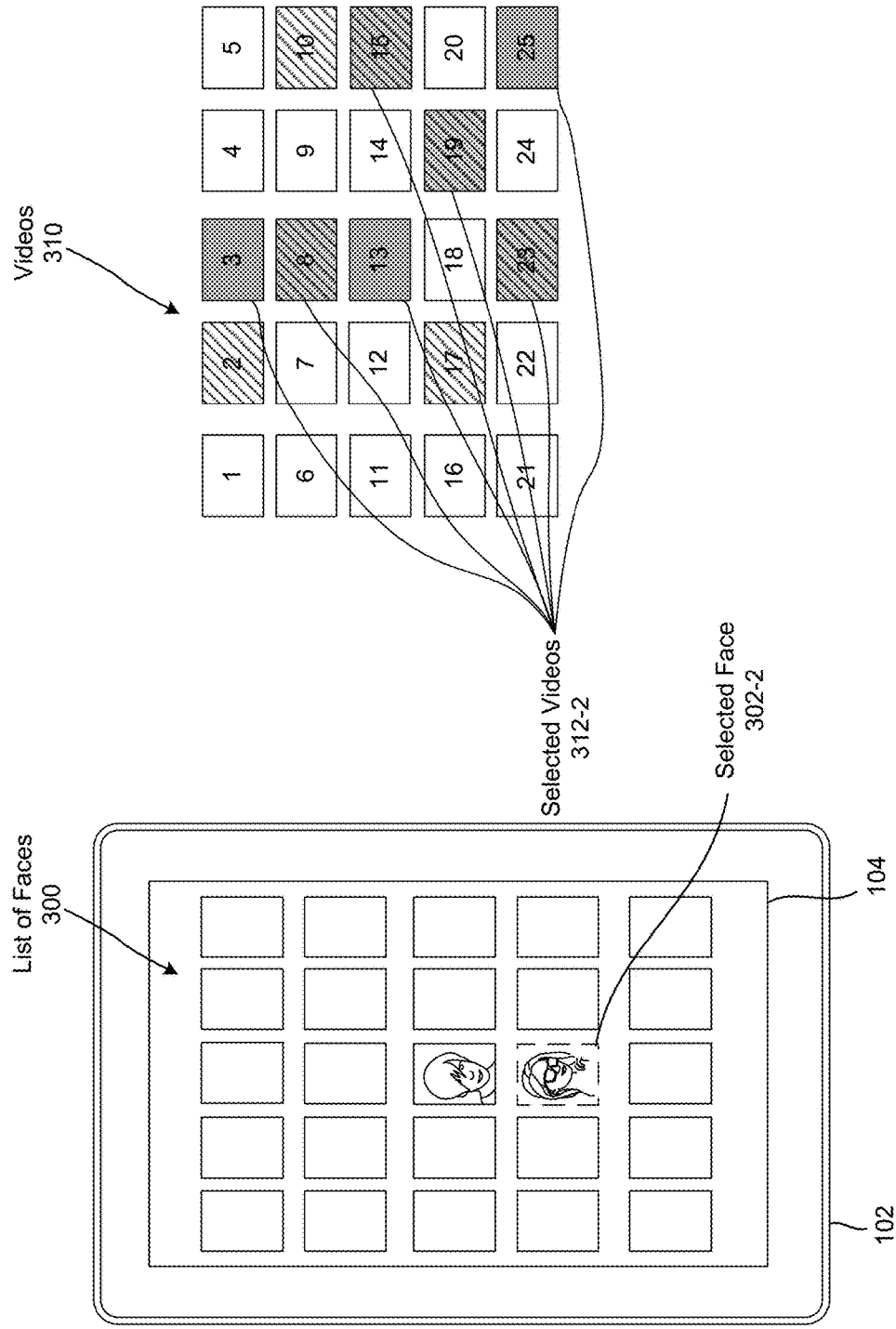

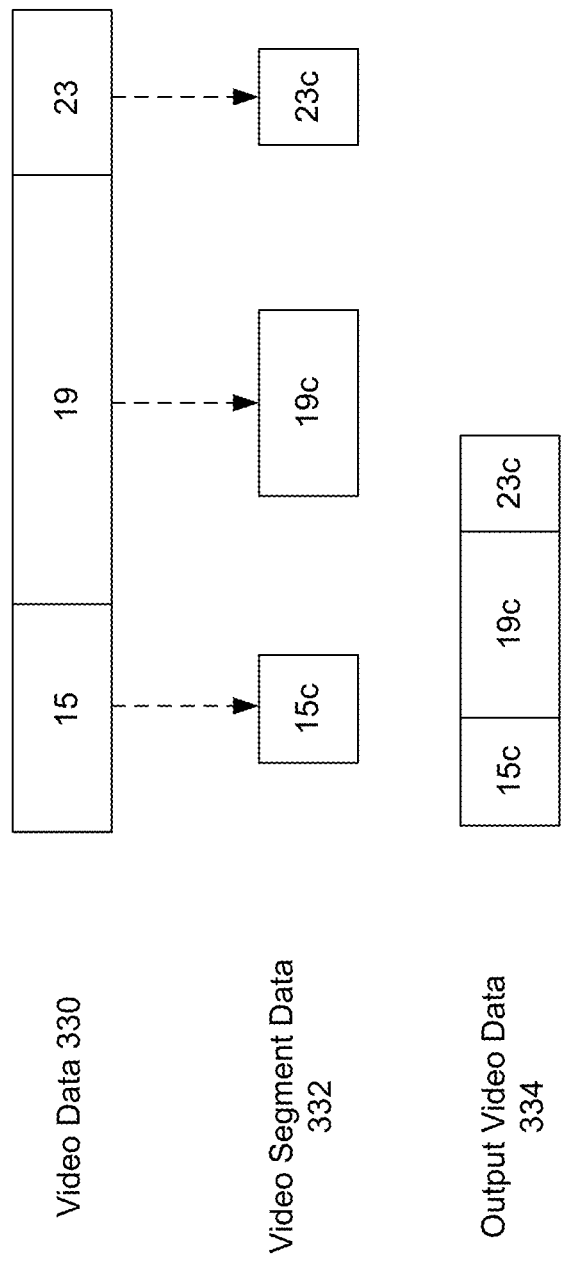

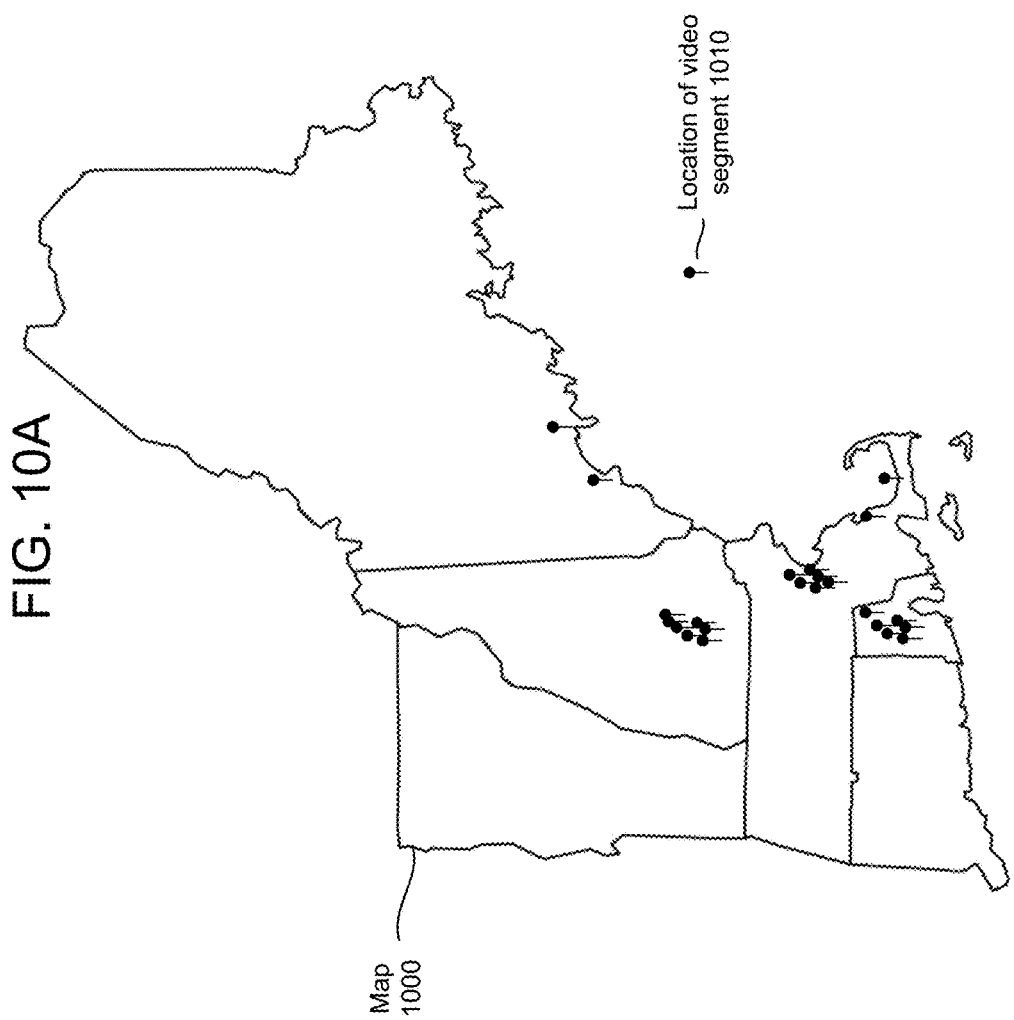

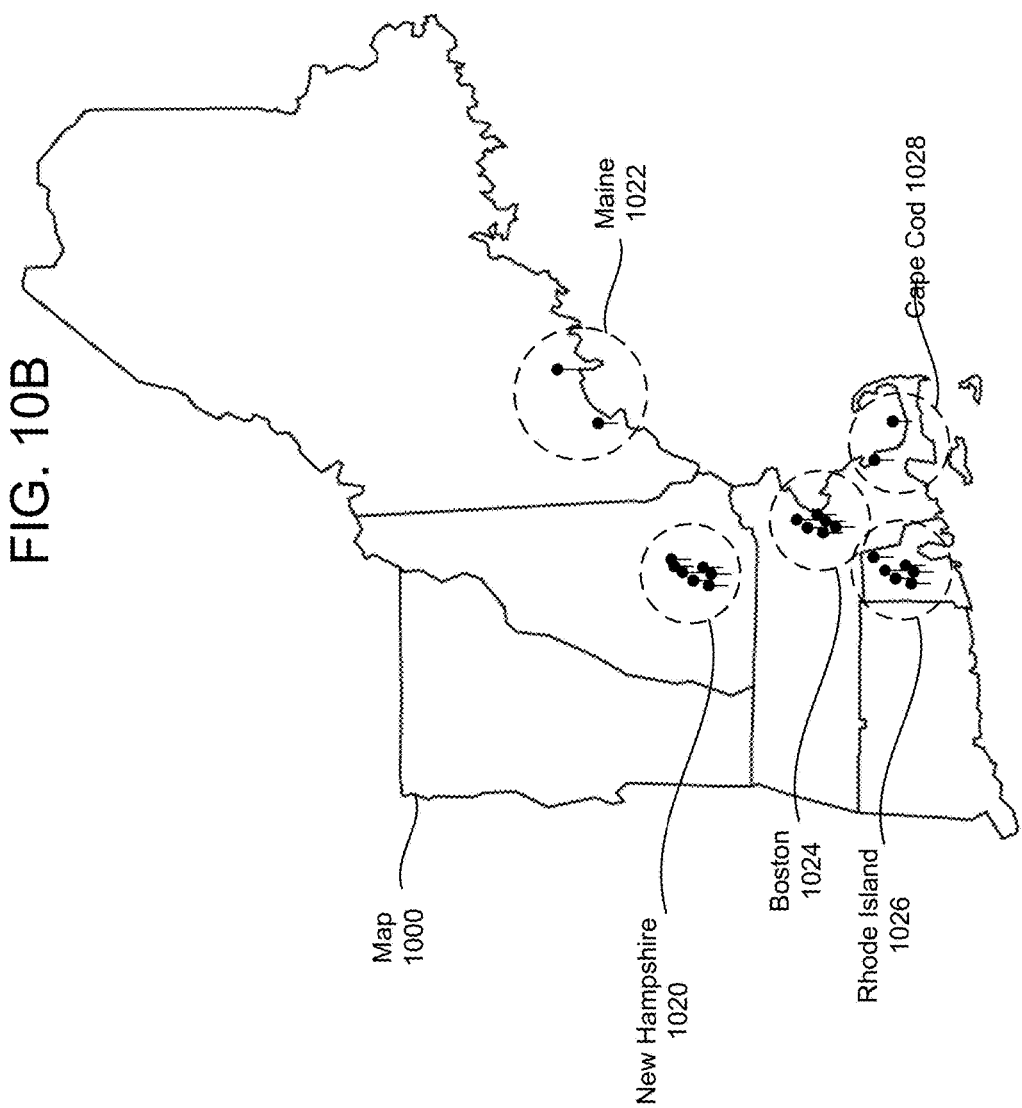

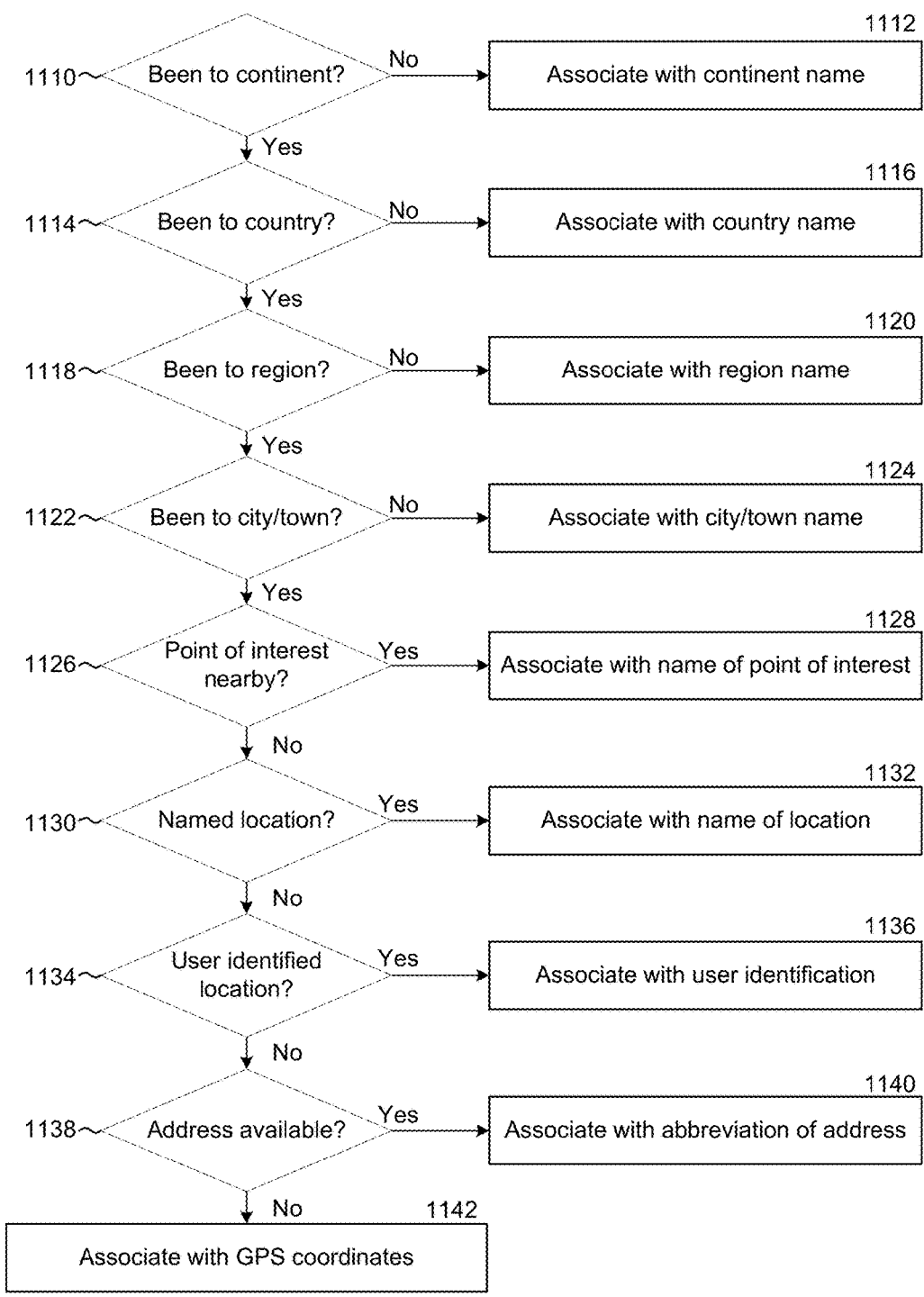

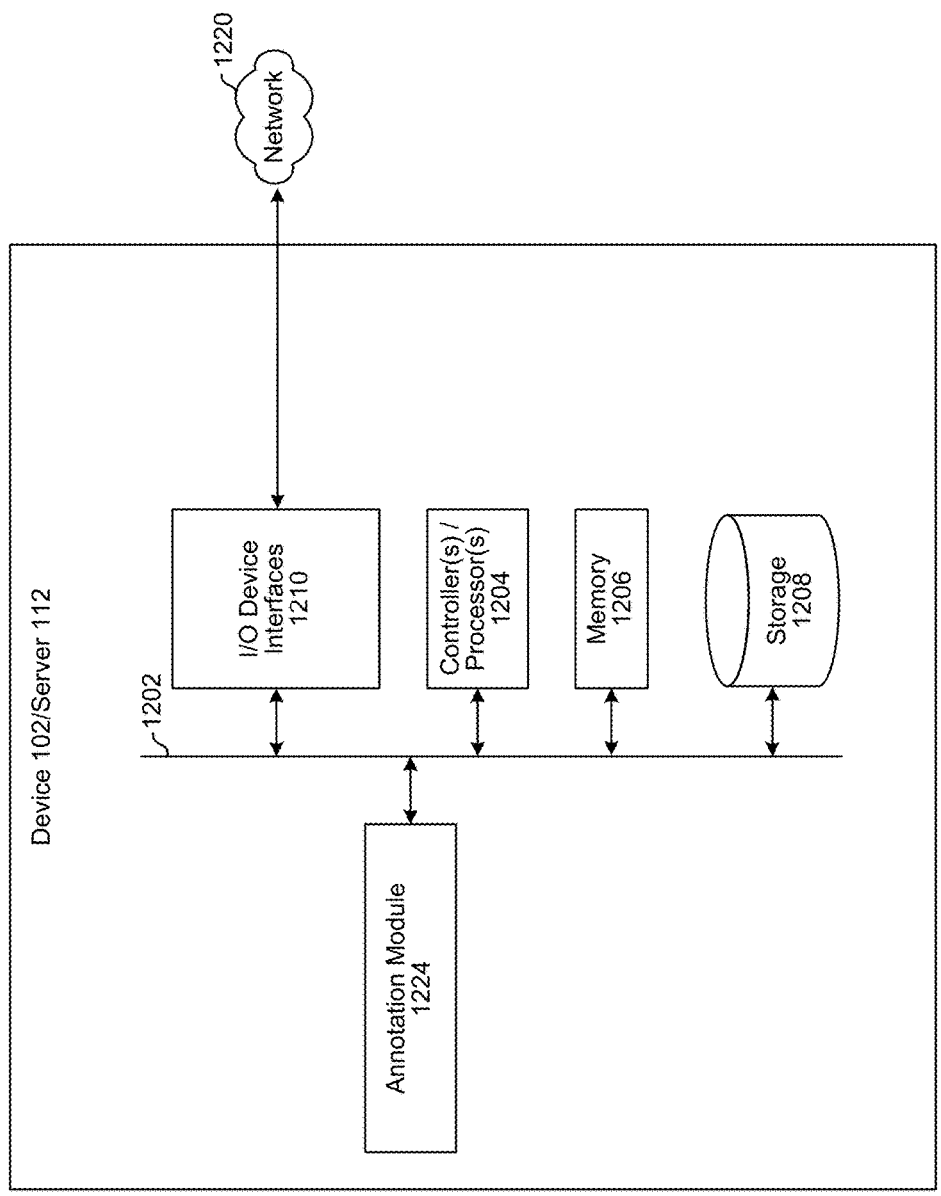

VIDEO SUMMARIZATION USING SELECTED CHARACTERISTICS

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve a user interface used to generate the videos that are shared.

BRIEF DESCRIPTION OF DRAWINGS

For a more complete understanding of the present disclosure, reference is now made to the following description taken in conjunction with the accompanying drawings.

FIG. 1 illustrates an overview of a system for generating a video summarization according to embodiments of the present disclosure.

FIGS. 2A-2D illustrate examples of generating a video summarization including video segments associated with a single face according to embodiments of the present disclosure.

FIGS. 3A-3E illustrate examples of generating a video summarization including video segments associated with two faces according to embodiments of the present disclosure.

FIG. 10A-10C illustrate examples of geographic annotation data according to embodiments of the present disclosure.

FIG. 11A-11B are flowcharts conceptually illustrating example methods for determining a geographic description for annotation data according to embodiments of the present disclosure.

FIG. 12 is a block diagram conceptually illustrating example components of a system according to embodiments of the present disclosure.

DETAILED DESCRIPTION

Figure 2A:
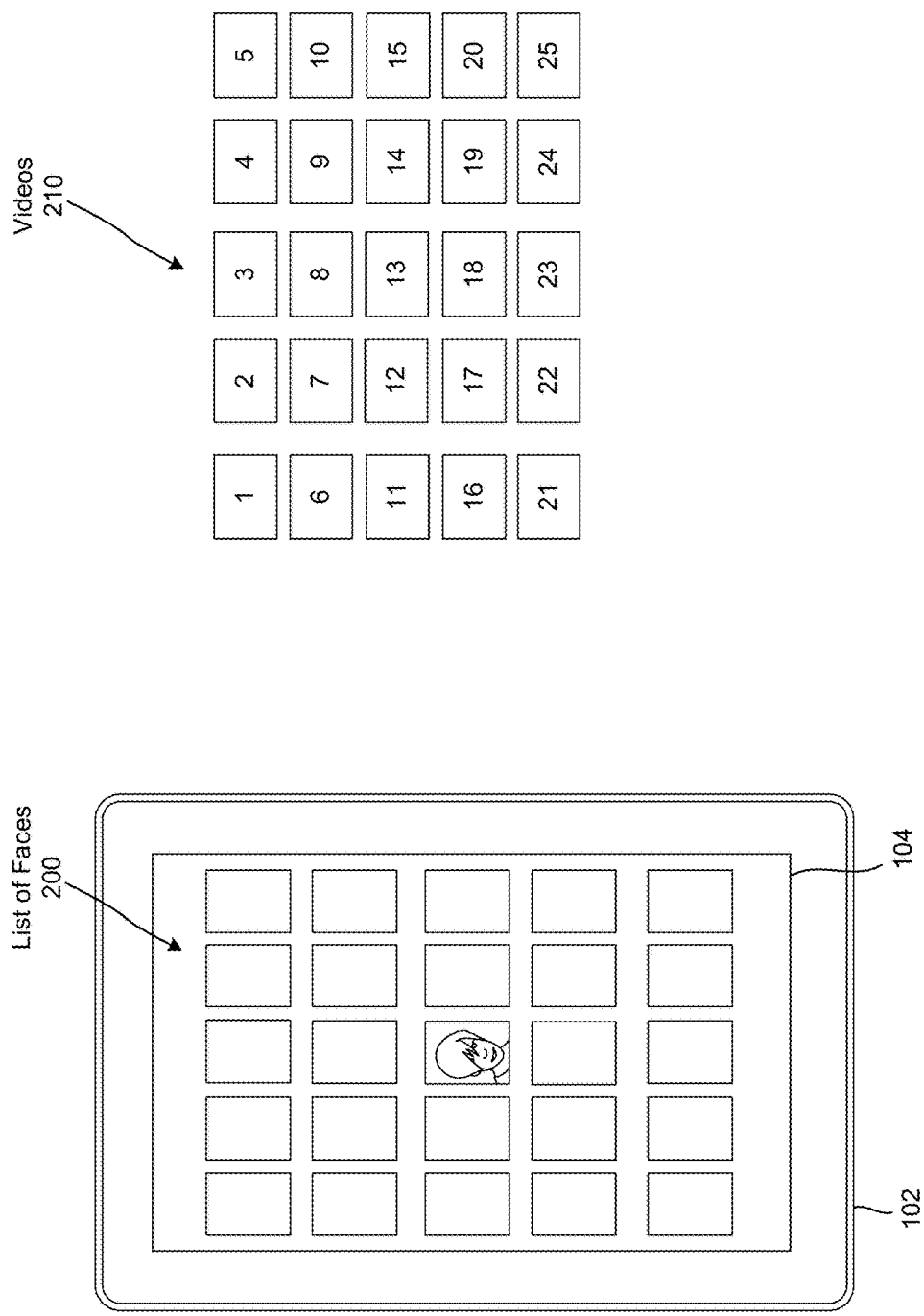

Electronic devices are commonly used to capture video data. The video data may include multiple video segments captured at different times, representing various people, objects and locations. During playback, a user of a device may have difficulty specifying a person and/or object of interest in the video data and may have to view the video data in sequence or manually edit the video data.

To improve a playback of video data and/or generation of video summarization, devices, systems and methods are disclosed that generate annotation data and select video segments to include in a video summarization based on the annotation data. For example, the system may generate annotation data for an individual video segment, the annotation data identifying characteristics of the video segment and/or objects represented in the video segment. Based on a request from the user, the system may generate a video summarization based on the annotation data, such as the characteristics and/or objects specified in the request. Thus, the system may focus a video summarization on a person, object and/or particular theme selected by the user.

FIG. 1 illustrates an overview of a system 100 for implementing embodiments of the disclosure. The system 100 includes a device 102, an image capture device 110 and a server 112 in communication with each other. While the following descriptions refer to the server 112 performing steps illustrated in the drawings due to computing complexity, the device 102 and/or the image capture device 110 may perform any or all of the steps without departing from the present disclosure. Thus, the method steps described below may be executed by a combination of components including the device 102, the image capture device 110 and/or the server 112. As illustrated in FIG. 1, the device 102 may display a list of faces 106 on a display 104 to a user and may generate a request based on input from the user. The device 102 may send the request to the server 112 and the server may generate a video summarization based on the request.

The server 112 may receive (120) video data. The video data may come from the device 102 or from image capture device 110. The video data may include a plurality of video segments captured at different times and/or geographic locations, the plurality of video segments representing various people, objects and/or locations. While the received video data may be raw video data captured by one or more cameras, the present disclosure is not limited thereto. Instead, the received video data may be an edited video segment generated from larger video data without departing from the present disclosure. For example, a user of the device 102 may identify relevant video segments within raw video data for additional editing, such as specifying events of interest or regions of interest within the raw video data. The device 102 may then input the selected portions of the raw video data as the received video data for further editing.

The server 112 may identify (122) faces in the video data, may generate (124) a face table and may send (126) the face table to the device 102. For example, the face table may be a data structure comprising a record of where each respective face of the plurality of faces appears in the video data, and the face table may be illustrated by the device 102 as the list of faces 106. The server 112 may identify faces using facial recognition, such as by analyzing individual video frames included in the video data and identifying faces, head and shoulders or the like. In some examples, the server 112 may determine an identity associates with at least a portion of the faces, although the present disclosure is not limited thereto. Instead, the server 112 may generate the face table without identity information and the device 102 may display the face table for the user to select and/or determine identities. Thus, the system may generate a face table or similar data structure noting where particular faces appear in the video data without the system necessarily associating respective identities (e.g., proper name) to the respective faces.

The server 112 may receive (128) an indication of a selected face and receive (130) an indication of a selected time period from the device 102. For example, the device 102 may display the face table to the user, determine a face selected by the user, display various time periods, determine a time period selected by the user and send the selected face and the selected time period to the server 112.

The server 112 may determine (132) video segments including the selected face within the selected time period. For example, the video data may include annotation data identifying characteristics of the video segments and/or objects represented in the video segments, and the server 112 may determine the video segments to include based on the annotation data. As described in greater detail below with regard to FIGS. 7-6, the server 112 may generate and update the annotation data, may determine a priority metric based on the annotation data and may select video segments having a priority metric exceeding a threshold. However, the present disclosure is not limited thereto and the server 112 may determine the video segments based only on the selected face and the selected time period. The server 112 may generate (134) a video summarization including the video segments and send (136) the video summarization to the device 102. While FIG. 1 illustrates the server 112 sending the video summarization to the device 102, the present disclosure is not limited thereto. Instead, the server 112 may send the video summarization to a remote device, may store the video summarization on the server 112 or may send a link to the video summarization to the device 102 and/or a remote device.

The video data may be captured using one or more camera(s). In some examples, the video data may be captured using a single camera. In other examples, the video data may include a field of view of 360 degrees captured using a plurality of cameras. Alternatively, the video data may be captured using a single camera without mirrors (e.g., a single camera spinning in a circle), a single camera using a plurality of mirrors, a plurality of cameras and a plurality of mirrors and/or a plurality of cameras without mirrors. However, the video data may capture a field of view less than 360 degrees without departing from the present disclosure.

The video data may include a plurality of video frames (e.g., sequence of image frames, each image frame associated with a particular time) and the device 102 may display a portion of the video data on the display 104 associated with a position (e.g., x and y pixel coordinates within a frame of video data) of an object (e.g., a face) within the video data. Thus, the device 102 may not display the entirety of the video data and dimensions of the displayed video data may be smaller than dimensions of the video frame, in some examples significantly smaller. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The video data may have an aspect ratio exceeding 2:1. An aspect ratio is a ratio of one dimension of a video frame to another dimension of a video frame (for example height-width or width-height). For example, a video frame having a resolution of 7680 pixels by 1080 pixels corresponds to an aspect ratio of 64:9 or more than 7:1. While video data may have a certain aspect ratio (for example 7:1 or other larger than 2:1 ratio) and may be considered panoramic video data due to a panoramic/360 degree nature of the incoming video data, the portion of the panoramic video data displayed on the display 104 may have an aspect ratio that is likely to be used on a viewing device. As a result, an aspect ratio of the portion of the panoramic video data displayed on the display 104 may be lower than 2:1. For example, the displayed video frame may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the displayed video data may vary based on user preferences. Similarly, an aspect ratio of output video data (e.g., a video summarization) may be lower than 2:1, as the output data is intended to be displayed on a display.

Pixel coordinates may specify a position within a video frame. For example, if the video frame has a resolution of 7680 pixels by 1080 pixels, a pixel coordinate of a bottom left pixel in the video frame may have pixel coordinates of (0, 0), a pixel coordinate of a top left pixel in the video frame may have pixel coordinates of (0, 1080), a pixel coordinate of a top right pixel in the video frame may have pixel coordinates of (7680, 1080) and a bottom right pixel in the video frame may have pixel coordinates of (7680, 0). Similarly, if the displayed video frame has a resolution of 1920 pixels by 1080 pixels, a pixel coordinate of a bottom left pixel in the displayed video frame may have pixel coordinates of (0, 0) in the video frame, a pixel coordinate of a top left pixel in the displayed video frame may have pixel coordinates of (0, 1080) in the video frame, a pixel coordinate in a top right pixel in the displayed video frame may have pixel coordinates of (1920, 1080) in the video frame and a bottom right pixel in the displayed video frame may have pixel coordinates of (1920, 0) in the video frame.

The video summarization may summarize lengthy video data (e.g., an hour of recording) in a short video summary (e.g., 2-5 minutes) highlighting the interesting events that occurred in the video data. Therefore, each video segment in the video summary may be relatively short (e.g., between 5-60 seconds) and the portion of the video data included in the video segment may be determined based on the face(s) and/or object(s) identified by a user of the device 102.

The device 102 may generate a request for a video summarization and transmit the request to the server 112 to perform video summarization on the video data. Based on the request, the server 112 may generate edited video segments of the video data, the edited video segments including portions of the video data specified by the request. For example, the server 112 may generate a video summarization including a series of video segments representing face(s) and/or object(s) specified by the request.

As part of generating the video summarization, the device 102 may display the output video data and may request input from a user of the device 102. For example, the user may instruct the device 102 to include additional video data (e.g., an additional video segment), to increase an amount of video data included in the output video data (e.g., change a beginning time and/or an ending time associated with a video segment to increase or decrease a length of the output video data), or the like. Thus, the server 112 may generate the output video data, the device 102 may display the output video data to the user and receive feedback from the user and the server 112 may generate additional or different output video data based on the user input.

FIGS. 2A-2D illustrate examples of generating a video summarization including video segments associated with a single person according to embodiments of the present disclosure. As illustrated in FIG. 2A, the device 102 may display a list of faces 200 associated with videos 210. For example, each of the faces included in the list of faces 200 may appear at least once in the videos 210.

The videos 210 may include a plurality of video segments captured at different times and/or geographic locations, the plurality of video segments representing various people, objects and/or locations. While the videos 210 may comprise raw video data captured by one or more cameras, the present disclosure is not limited thereto. Instead, the videos 210 may comprise edited video segments generated from raw video data without departing from the present disclosure. For example, a user of the device 102 may identify relevant video segments within raw video data for additional editing, such as specifying events of interest or regions of interest within the raw video data. The server 112 may generate the videos 210 based on the video segments identified by the user.

In some examples, the server 112 may perform additional steps to generate the videos 210. For example, the raw video data may be uploaded to the server 112 from an image capture device and the server 112 may annotate the raw video data (e.g., annotate individual video frames included in the raw video data to identify characteristics of the individual video frames), generate a master clip table (e.g., a table including the individual video frames and annotations) and generate edited video segments (e.g., video segments including a portion of the raw video data) based on the master clip table and/or the annotations. For example, the server 112 may generate video segments including a specific period of time (e.g., determine a begin point and an end point) and/or a specific area within the raw video data (e.g., crop the raw video data).

As illustrated in FIG. 2B, the user may indicate a particular face (e.g., make contact within proximity to the particular face) and the device 102 may interpret the input to determine a selected face 202 from the list of faces 200. The selected face 202 may be associated with a portion of the videos 210, such as selected videos 212 (e.g., videos 2, 8, 10, 15, 17, 19 and 23). As illustrated in FIG. 2B, the selected videos 212 associated with the selected face 202 are shaded and the annotation data associated with the selected videos 212 may identify the selected face 202.

As illustrated in FIG. 2C, the device 102 may display a timeframe user interface (UI) 220 to the user. For example, the timeframe UI 220 may include "Last Week," "Last Month," "Last Few Months," "All Time," "Custom Time Period" or the like. However, the present disclosure is not limited thereto and the device 102 may display any option associated with a period of time. The user may indicate a particular timeframe (e.g., make contact within proximity to the particular timeframe) and the device 102 may interpret the input to determine the selected timeframe 222 from the timeframe UI 220. As illustrated in FIG. 2C, the device 102 may determine that the user selected "Last Few Months" as the selected timeframe 222. Therefore, the device 102 may select the portion of the videos 210 captured within the selected timeframe 222 (e.g., the videos 210 selected within the last few months), such as videos 14 through 25. The device 102 may send the selected face 202 and the selected timeframe 222 to the server 112 to generate a video summarization.

While not illustrated in FIG. 2C, the device 102 may display other options to filter the video data. For example, the device 102 may display a geographic location UI to the user indicating geographic locations that the user may select (e.g., "At Home," "At Work," "Massachusetts," "On Vacation," etc.). Based on input from the user, the device 102 may select the portions of the videos 210 captured within the selected geographic locations. As another example, the device 102 may display a theme UI to the user indicating potential themes that the user may select (e.g., "Vacation," "Road Trip," "Wedding," "Birthday," "Sporting Event," etc.). Based on input from the user, the device 102 may select the portions of the videos 210 associated with the selected themes based on annotation data. The present disclosure is not limited to the abovementioned filters (e.g., timeframe, location and theme) and the device 102 may display additional UI's indicating other filtering options without departing from the disclosure.

The server 112 may determine the video segments associated with the selected face 202 and the selected timeframe 222 and may generate a video summarization. For example, the server 112 may identify videos (e.g., 15, 17, 19 and 23) from the selected videos 212, may edit the videos and may generate the video summarization including the edited videos. As illustrated in FIG. 2D, the server 112 may determine video data 230 comprising videos 15, 17, 19 and 23 and may generate video segment data 232 comprising videos 15c (cropped), 17c, 19c and 23c. The video segment data 232 may be selections of the video data 230 not only in time (e.g., a video segment lasting 10 seconds selected from video data lasting 50 seconds), but also in space (e.g., an area of pixels selected from a video frame). For example, video segment data 232 having a resolution of 1920 pixels by 1080 pixels may be selected from video data 230 having a resolution of 7680 pixels by 1080 pixels. As another example, video segment data 232 having an aspect ratio less than 2:1 (e.g., 16:9, 4:3 or the like) may be selected from video data 230 having an aspect ratio greater than 2:1 (e.g., 7:1 or the like). The video segment data 232 may be cropped to emphasize the selected face 202 within the video data 230 and the server 112 may generate output video data 234 comprising the video segment data 232. Thus, the output video data 234 may be a video summarization focused on the selected face 202. While FIG. 2D illustrates the video segment data 232 included in the output video data 234 chronologically, the present disclosure is not limited thereto. Instead, the server 112 may arrange the video segment data 232 in any order without departing from the present disclosure.

Figure 3D:
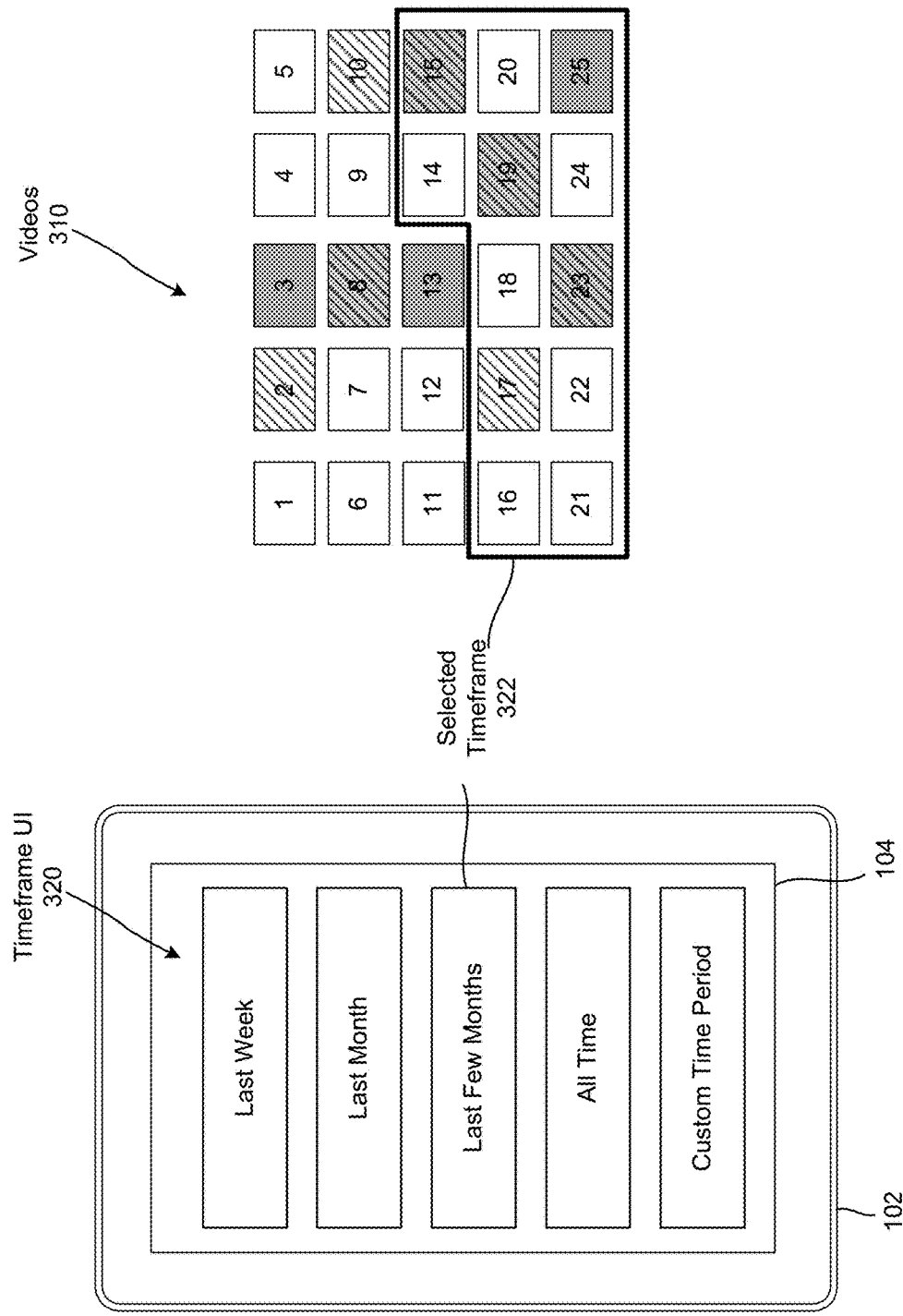

FIGS. 3A-3E illustrate examples of generating a video summarization including video segments associated with two people according to embodiments of the present disclosure. As illustrated in FIG. 3A, the device 102 may display a list of faces 300 associated with videos 310. For example, each of the faces included in the list of faces 300 may appear at least once in the videos 310. As illustrated in FIG. 3B, the user may indicate a particular face (e.g., make contact within proximity to the particular face) and the device 102 may interpret the input to determine a first selected face 302-1 from the list of faces 300. The first selected face 302-1 may be associated with a portion of the videos 310, such as first selected videos 312-1 (e.g., videos 2, 8, 10, 15, 17, 19 and 23). As illustrated in FIG. 3B, the first selected videos 312-1 associated with the first selected face 302-1 are shaded and the annotation data associated with the first selected videos 312-1 may identify the first selected face 302-1.

As illustrated in FIG. 3C, the user may indicate a particular face (e.g., make contact within proximity to the particular face) and the device 102 may interpret the input to determine a second selected face 302-2 from the list of faces 300. The second selected face 302-2 may be associated with a portion of the videos 310, such as second selected videos 312-2 (e.g., videos 3, 8, 13, 15, 19, 23 and 25). As illustrated in FIG. 3C, the second selected videos 312-2 associated with the second selected face 302-2 are shaded and the annotation data associated with the second selected videos 312-2 may identify the second selected face 302-2. As illustrated in FIG. 3C, videos 8, 15, 19 and 23 are associated with both the first selected face 302-1 and the second selected face 302-2.

As illustrated in FIG. 3D, the device 102 may display a timeframe user interface (UI) 320 to the user. For example, the timeframe UI 320 may include "Last Week," "Last Month," "Last Few Months," "All Time," "Custom Time Period" or the like. However, the present disclosure is not limited thereto and the device 102 may display any option associated with a period of time. The user may indicate a particular timeframe (e.g., make contact within proximity to the particular timeframe) and the device 102 may interpret the input to determine the selected timeframe 322 from the timeframe UI 320. As illustrated in FIG. 3C, the device 102 may determine that the user selected "Last Few Months" as the selected timeframe 322. Therefore, the device 102 may select the portion of the videos 310 captured within the selected timeframe 322 (e.g., the videos 310 selected within the last few months), such as videos 14 through 25. The device 102 may send the first selected face 302-1, the second selected face 302-2 and the selected timeframe 322 to the server 112 to generate a video summarization.

As discussed above, while not illustrated in FIG. 3D the device 102 may display additional options to filter the video data. For example, the device 102 may display a geographic location UI to the user indicating geographic locations that the user may select (e.g., "At Home," "At Work," "Massachusetts," "On Vacation," etc.). Based on input from the user, the device 102 may select the portions of the videos 310 captured within the selected geographic locations. As another example, the device 102 may display a theme UI to the user indicating potential themes that the user may select (e.g., "Vacation," "Road Trip," "Wedding," "Birthday," "Sporting Event," etc.). Based on input from the user, the device 102 may select the portions of the videos 310 associated with the selected themes based on annotation data. The present disclosure is not limited to the abovementioned filters (e.g., timeframe, location and theme) and the device 102 may display additional UI's indicating other filtering options without departing from the disclosure.

The server 112 may determine the video segments associated with the first selected face 302-1, the second selected face 302-2 and the selected timeframe 322 and may generate a video summarization. For example, the server 112 may identify videos (e.g., 15, 19 and 23) included in the first selected videos 312-1 and the second selected videos 312-2 within the selected timeframe 322, may edit the videos and may generate the video summarization including the edited videos. As illustrated in FIG. 3E, the server 112 may determine video data 330 comprising videos 15, 19 and 23 and may generate video segment data 332 comprising videos 15c (cropped), 19c and 23c. The video segment data 332 may be selections of the video data 330 not only in time (e.g., a video segment lasting 10 seconds selected from video data lasting 50 seconds), but also in space (e.g., an area of pixels selected from a video frame). For example, video segment data 332 having a resolution of 1920 pixels by 1080 pixels may be selected from video data 330 having a resolution of 7680 pixels by 1080 pixels. As another example, video segment data 332 having an aspect ratio less than 2:1 (e.g., 16:9, 4:3 or the like) may be selected from video data 330 having an aspect ratio greater than 2:1 (e.g., 7:1 or the like). The video segment data 332 may be cropped to emphasize the selected faces 302 within the video data 330 and the server 112 may generate output video data 334 comprising the video segment data 332. Thus, the output video data 334 may be a video summarization focused on the first selected face 302-1 and the second selected face 302-2. While FIG. 3E illustrates the video segment data 332 included in the output video data 334 chronologically, the present disclosure is not limited thereto. Instead, the server 112 may arrange the video segment data 332 in any order without departing from the present disclosure.

Figure 4:
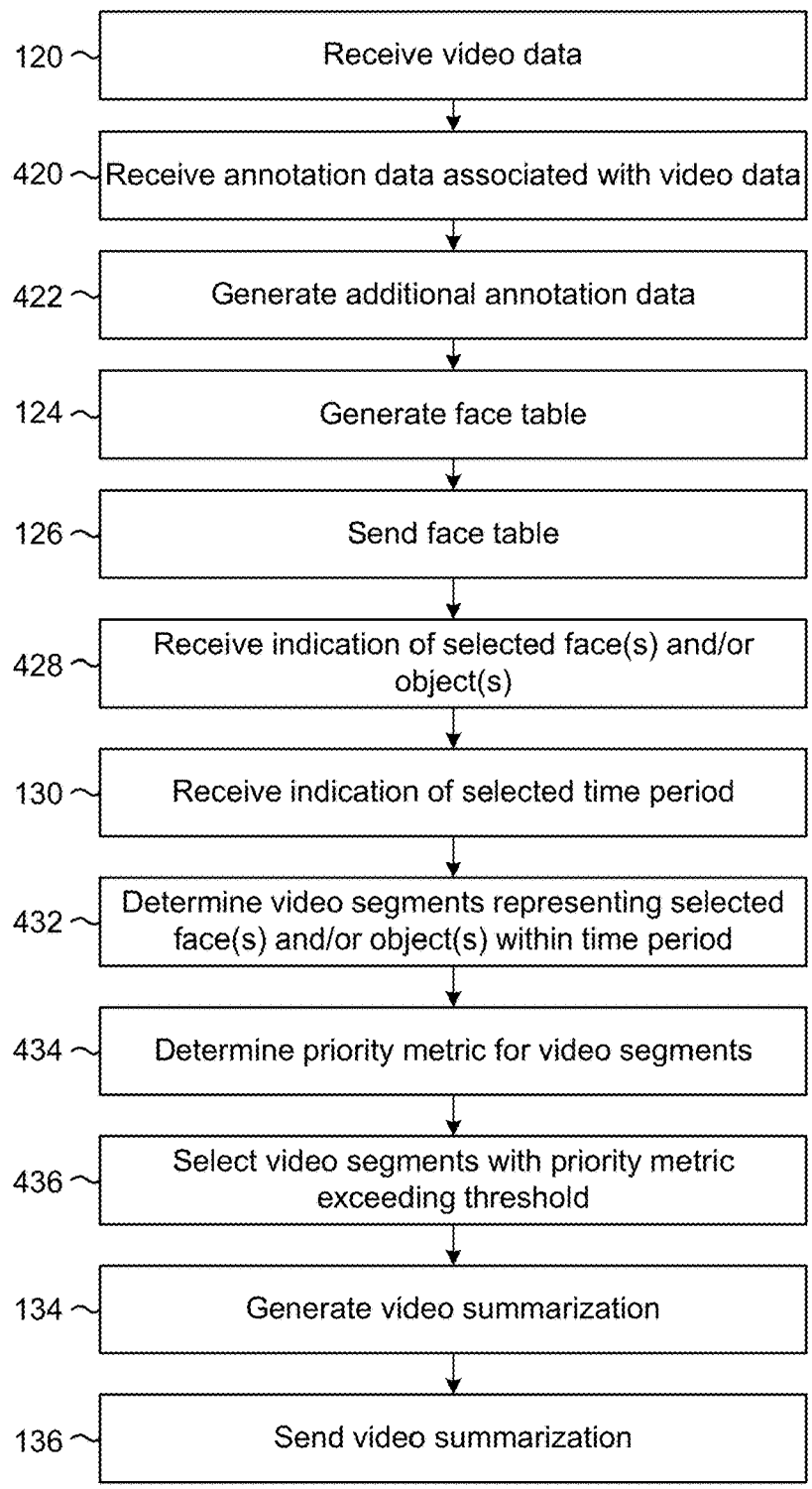
FIG. 4 is a flowchart conceptually illustrating an example method for generating a video summarization based on multiple objects according to embodiments of the present disclosure.

FIG. 4 is a flowchart conceptually illustrating an example method for generating a video summarization based on multiple objects according to embodiments of the present disclosure. For ease of explanation, a detailed description of steps discussed above with regard to FIG. 1 is omitted. As illustrated in FIG. 4, the server 112 may receive (120) video data and may receive (420) annotation data associated with the video data. For example, the server 112 may receive annotation data previously generated by the server 112 or a separate device. The server 112 may generate (422) additional annotation data, as described in greater detail below with regard to FIGS. 7-6. The server 112 may generate (124) the face table, send (126) the face table to the device 102 and receive (428) an indication of selected face(s) and/or object(s) from the device 102. For example, the server 112 may receive an indication of a face, an indication of two faces, an indication of a face and an object, an indication of two objects or the like. Thus, the server 112 may receive input indicating a focus for the video summarization.

While step 428 describes the server 112 receiving the indication of selected face(s) and/or object(s), the present disclosure is not limited thereto. Instead, the server 112 may receive an indication of selected characteristic(s) of the video data and may focus the video summarization on the selected characteristic(s). For example, the annotation data may identify characteristics of a video segment and/or characteristics of objects represented in the video segment, which includes faces, objects, locations, indication of motion, scenes, indication of audio or the like. Thus, the user may indicate characteristic(s) and the server 112 may determine video data to include in the video summarization based on the characteristic(s). Additionally or alternatively, the user may indicate characteristic(s) not to include and the server 112 may determine video data that doesn't include the characteristic(s). For example, the user may indicate a person and/or a time frame and the server 112 may exclude video data including the person within the time frame. In some examples, the server 112 may determine a theme based on the selected characteristic(s) or the user may indicate a theme to the server 112 and the server 112 may generate a video summary using the theme.

The server 112 may receive (130) an indication of a selected time period and may determine (432) video segments representing the selected face(s) and/or object(s) within the selected time period. The server 112 may determine (434) a priority metric for individual video segments and may select (436) video segments with priority metrics exceeding a threshold. The server 112 may generate (134) a video summarization and send (136) the video summarization to the device 102, although the present disclosure is not limited thereto. In addition to selecting video segments with priority metrics exceeding the threshold, the server 112 may rank the video segments, and in some examples, the server 112 may only select a portion of the video segments with priority metrics exceeding the threshold. For example, the server 112 may select a desired number of video segments based on the rankings (e.g., the top thirty video segments or the like). Thus, the server 112 may select the number of video segments based on the desired number to include in the video summarization, instead of selecting all video segments exceeding a global priority threshold. In some examples, the threshold may be determined based on the desired number of video segments, such that a first threshold for a first video summarization may be different from a second threshold for a second video summarization.

For example, the server 112 may store video data comprising video segments, each video segment including sequential video frames, and the server 112 may determine relevant video frames from the video segments based on the annotation data associated with the video segments. In some examples, the annotation data may include a master clip table, which is a frame by frame list of different points in the video data, and the server 112 may use an algorithm to determine the priority metric for each video frame. For example, the server 112 may determine the priority metric for a video frame based on interesting features (e.g., faces, people, smiles, motion, etc.) and may store the priority metric in the master clip table. Thus, when the server 112 receives a request for a selected face included in the video frame, the server 112 may refer to the master clip table to identify video frames including the selected face with a priority metric exceeding a threshold.

Based on the priority metric, the server 112 may ignore a video segment despite the video segment including the selected face(s) and/or object(s) (e.g., exclude the video segment completely), ignore video frames including the selected face(s) and/or object(s) (e.g., clip the video segment based on the priority metric) within the video segment or the like. In some examples, the server 112 may generate the priority metric based on the selected face(s) and/or object(s). For example, a particular video segment may have a higher priority metric when the video segment includes multiple selected face(s) and/or object(s) relative to a lower priority metric when the video segment includes a single selected face. In other examples, the server 112 may selectively crop a display area of the video segment to focus on the selected face(s) and/or object(s). For example, the video data may include a wide field of view and the server 112 may crop the video data to display a narrow field of view focused on an individual.

Figure 5:
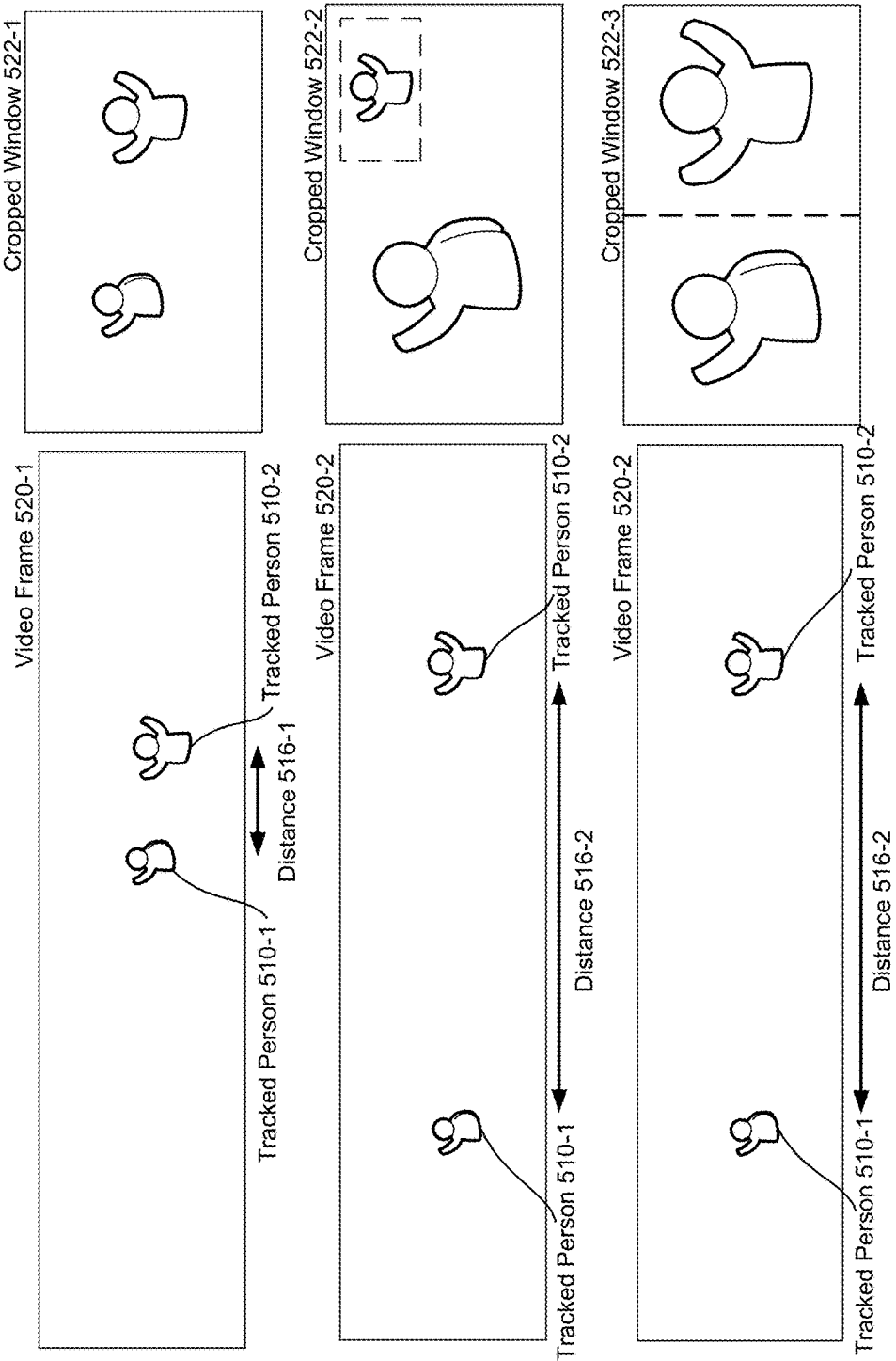
FIG. 5 illustrates an example of generating a split screen according to embodiments of the present disclosure.

In some examples, a first face and a second face may be represented in the video data within proximity to each other and the cropped video data may comprise an area including the first face and the second face. However, in other examples the first face and the second face may be separated and the server 121 cannot crop the video data to include the first face and the second face due to an intervening area. FIG. 5 illustrates an example of generating a split screen according to embodiments of the present disclosure. As illustrated in FIG. 5, a first video frame 520-1 may include a first tracked person 510-1 and a second tracked person 510-2 separated by a first distance 516-1. As the first tracked person 510-1 and the second tracked person 510-2 are within proximity to each other (e.g., the first distance 516-1 is below a threshold), the server 112 may generate a first cropped window 522-1 including the first tracked person 510-1 and the second tracked person 510-2. In contrast, a second video frame 520-2 may include the first tracked person 510-1 and the second tracked person 510-2 separated by a second distance 516-2. As the first tracked person 510-1 and the second tracked person 510-2 are separated from each other (e.g., the second distance 516-2 exceeds a threshold), the server 112 may generate a second cropped window 522-2 including a picture in picture, such as the second tracked person 510-2 included in a picture within the second cropped window 522-2. Additionally or alternatively, the server 112 may generate a third cropped window 522-3 including a split screen, such as the second tracked person 510-2 included next to the first tracked person 510-1 with the intervening space omitted.

Figure 6:
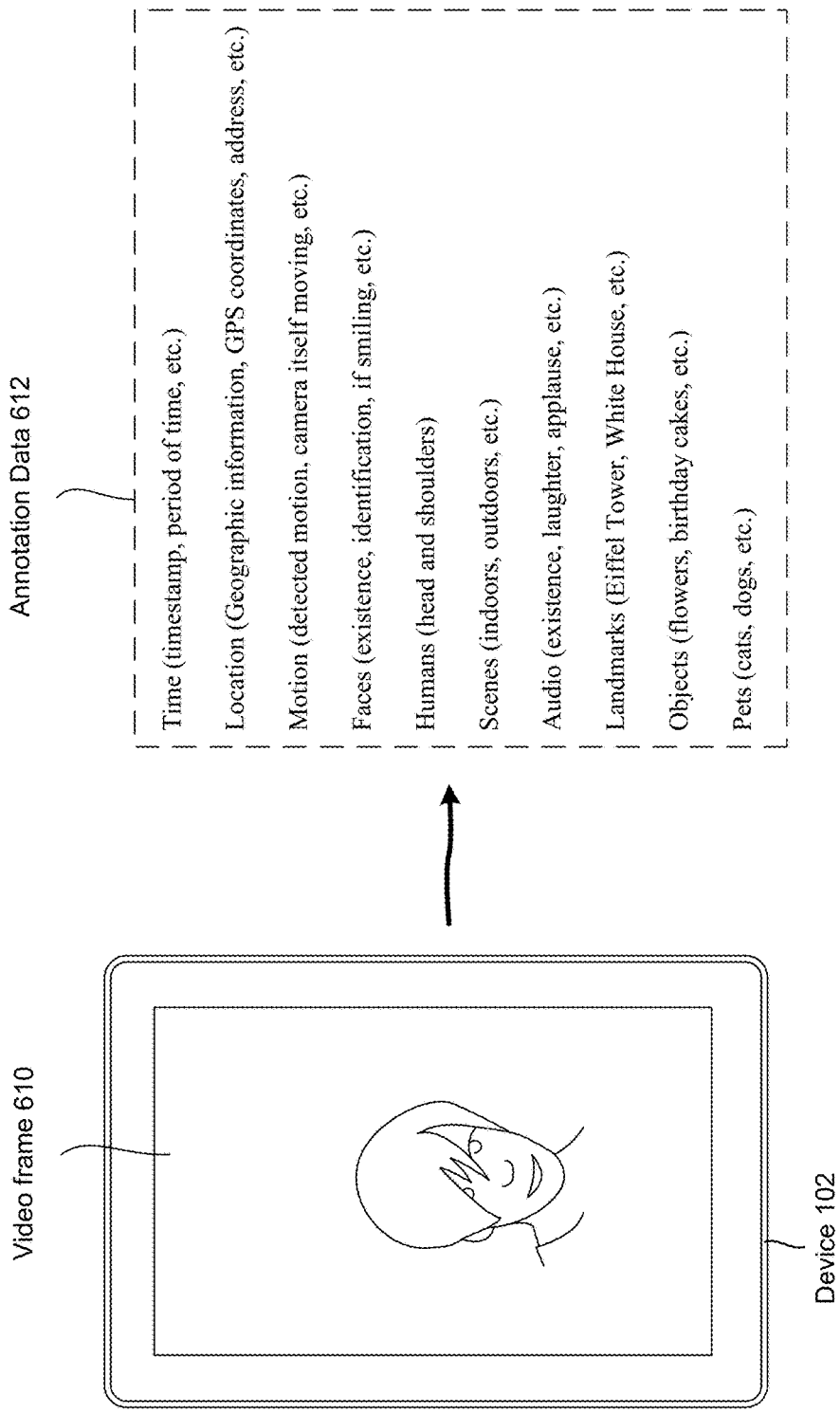
FIG. 6 illustrates an example of annotation data according to embodiments of the present disclosure.

FIG. 6 illustrates an example of types of annotation data according to embodiments of the present disclosure. As illustrated in FIG. 6, the server 112 may analyze a video frame 610 and generate annotation data 612, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, laughter, applause, etc.), landmarks (e.g., Eiffel Tower, White House, etc.), objects (flowers, birthday cakes, etc.) and/or pets (e.g., cats, dogs, etc.).

In addition to the annotation data illustrated in FIG. 6, the server 112 may generate additional annotation data. For example, the server 112 may generate emotional data, which may include emotional detection (e.g., determining a mood such as happy, sad, excited, etc.) for an individual, a group of people, the video frame 610 or a combination thereof. As another example, the server 112 may determine if a concert or other event is represented in the video frame 610 and may match the geographic location to the event. For example, the server 112 may determine venues in proximity to the geographic location, events scheduled for the venues and determine if one of the events is represented in the video data. In some examples, the server 112 may detect indications of an event (e.g., detecting a crowd, an amphitheater, a concert hall or the like) and may compare the geographic information to venues in proximity as a result of detecting the indications.

In some examples, the server 112 may perform speech recognition on speech detected in audio associated with the video data to generate output text and may embed the output text in the annotation data. As a first example, the server 112 may include output text corresponding to all of the speech detected in the audio, such as a transcription of a conversation or the like. As a second example, the server 112 may analyze the output text and include a portion of the output text corresponding to key phrases. For example, the server 112 may recognize "Happy Birthday" or a particular name in the output text and include the recognized phrase in associated annotation data.

Figure 7:
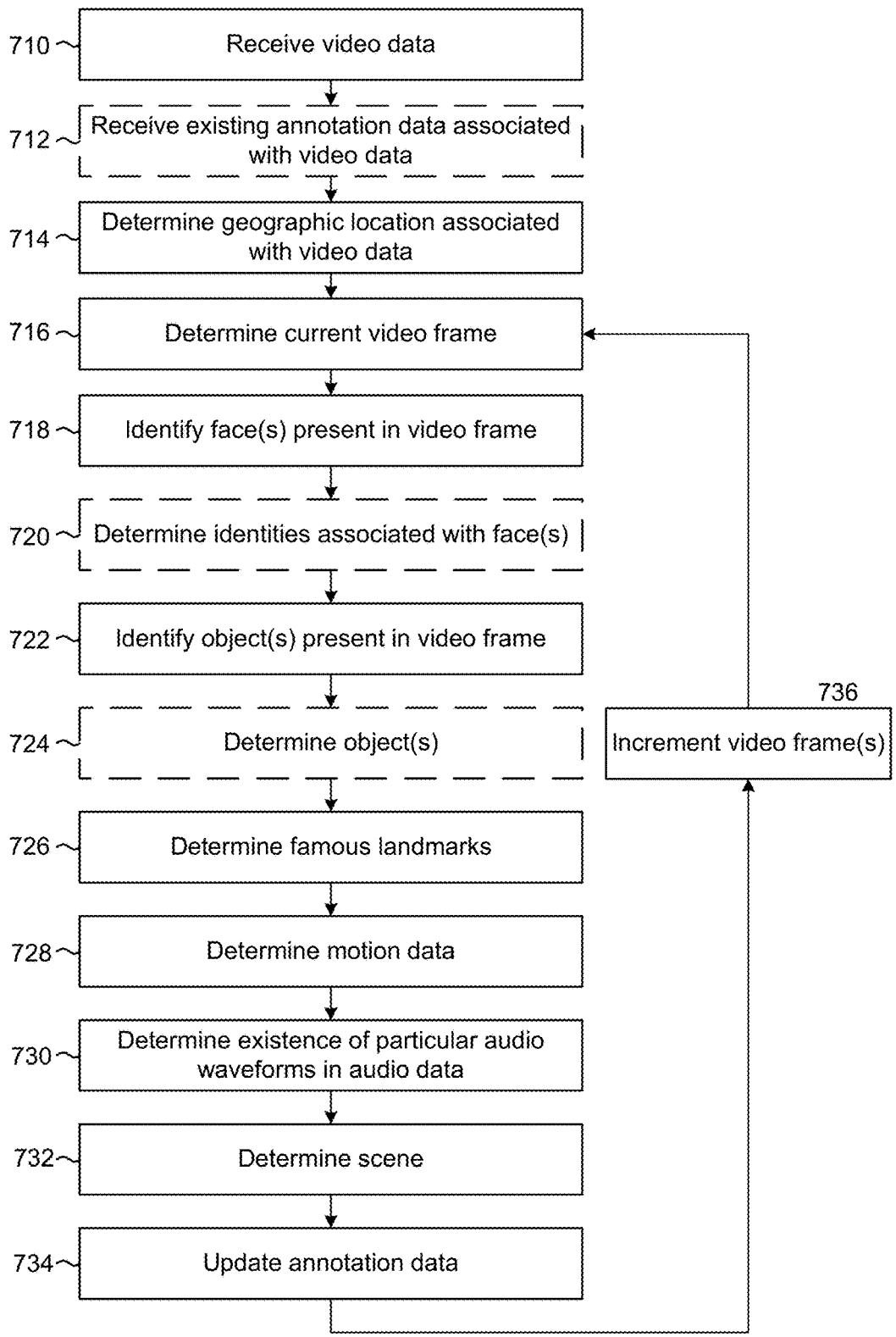
FIG. 7 is a flowchart conceptually illustrating an example method for generating annotation data according to embodiments of the present disclosure.

FIG. 7 is a flowchart conceptually illustrating an example method for generating annotation data according to embodiments of the present disclosure. As discussed above, the annotation data may be generated by the server 112 or a remote device prior to generating the video summarization. For example, the server 112 may generate annotation data upon receiving individual video segments, upon receiving video data or upon receiving a request for a video summarization. For ease of explanation, some of the steps illustrated in FIG. 7 are explicitly depicted as optional, indicated by dashed lines. However, any of the steps illustrated in FIG. 7 may be omitted without departing from the present disclosure. In addition, while the following description refers to the steps illustrated in FIG. 7 being executed by the server 112, some or all of the steps illustrated in FIG. 7 may be executed by the device 102, the image capture device 110, the server 112, a remote device or any combination thereof.

As illustrated in FIG. 7, the server 112 may receive (710) video data and may optionally receive (712) existing annotation data associated with the video data. The existing annotation data may have been determined by any of the device 102, the image capture device 110, the server 112 and/or a remote device prior to the system receiving the video data in step 710. While video data may include multiple video segments, the video data illustrated in FIG. 7 refers to video data associated with a single video segment (e.g., a video clip captured from a beginning time to an ending time). The server 112 may determine (714) a geographic location associated with the video data, such as a Global Positioning System (GPS) coordinates associated with where the video data was captured. However, the geographic location is not limited to the GPS coordinates and the server 112 may determine a geographic location based on the GPS coordinates, as discussed in greater detail below with regard to FIGS. 10A-11B. If the video data is captured while in motion (e.g., in a plane, a car or other vehicle), the geographic location may be associated with the beginning time or the ending time of the video data.

The server 112 may determine (716) a current video frame and may identify (718) face(s) present in the video frame. For example, the server 112 may analyze the video frame and identify the face(s) based on facial recognition, identifying head and shoulders, identifying eyes, smile recognition or the like. Optionally, the server 112 may determine (720) identities associated with the face(s). For example, the server 112 may employ facial recognition and a database of identities, such as social networking database, to determine the identities. In some examples, the video data will be tagged with identities of faces represented in the video data. Thus, the server 112 may determine the identity of a face in a video frame from a list of identities associated with the video data.

The server 112 may identify (722) object(s) present in the video frame. For example, the server 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server 112 may determine (724) object(s), which may include determining a type of object, a brand of the object, a name for the object or the like. Thus, whereas step 722 identifies an existence of the object in the video frame, step 724 identifies an identity of the object or otherwise recognizes what the object is. The server 112 may determine (726) famous landmarks (e.g., Big Ben, a famous cathedral, monument or the like) represented in the video frame based on the geographic location. For example, the geographic location may be in proximity to a monument and the server 112 may identify the monument within the video frame.

The server 112 may determine (728) motion data, including motion data associated with the image capture device (e.g., movement of the image capture device while capturing the video data) and objects represented in the video data (e.g., movement of an object relative to the image capture device). The server 112 may determine (730) an existence of particular audio waveforms in audio data associated with the video data. For example, the server 112 may identify an existence of speech, laughter, applause or the like. In some examples, as discussed in greater detail below with regard to FIG. 9, the server 112 may identify music in the audio data. The server 112 may determine (732) a scene associated with the video frame. For example, the server 112 may determine if the video frame was captured indoors or outdoors and may determine other characteristics that may be useful in determining a scene associated with the video frame. Finally, the server 112 may update (734) the annotation data associated with the video frame and increment (736) video frame(s) (e.g., one video frame, several video frames or the like) and repeat steps 716-34. For example, the server 112 may increment video frames linearly to update annotation data for video frames in the video data by one or at a fixed increment. Additionally or alternatively, the server 112 may increment the video frame(s) nonlinearly to focus on annotating interesting frames, which may be determined based on a low resolution preview or other techniques. Thus, the server 112 may determine an amount to increment each time step 736 is performed and the amount to increment may vary without departing from the present disclosure.

In addition to using annotation data to generate video summarizations, the server 112 may use the annotation data for additional functionality. As a first example, the server 112 may extract information about a user from the annotation data and may use the extracted information to target advertisements to the user. As a second example, the server 112 may collect annotation data from a plurality of users and/or video segments to collate information. Thus, the server 112 may create a database of annotation data and may use the database to identify trends, brands or the like from video data from a variety of sources. As an example, FIG. 8A-8C are flowcharts conceptually illustrating example methods for determining consumer good information according to embodiments of the present disclosure.

Figure 8A:
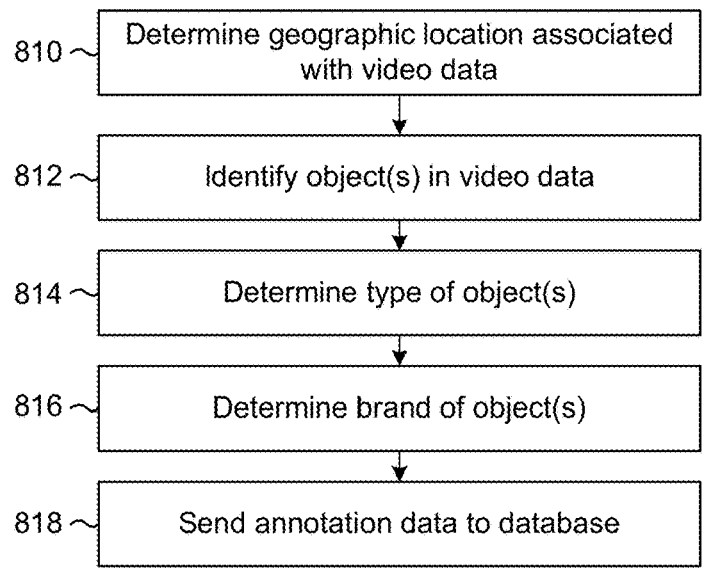
FIG. 8A-8C are flowcharts conceptually illustrating example methods for determining consumer good information according to embodiments of the present disclosure.

As illustrated in FIG. 8A, the server 112 may determine (810) a geographic location associated with video data, may identify (812) object(s) in the video data, may determine (814) a type of object(s), may determine (816) a brand of the object(s) and may send (818) the annotation data to a database. For example, the server 112 may receive video data associated with a video segment and may determine a geographic location (e.g., a city) associated with the video segment. The server 112 may analyze the video data, frame by frame, to identify objects and a type of object such as a polo shirt, jeans, sunglasses or the like represented in a first video frame. The server 112 may determine a brand associated with the objects, such as a first brand associated with the polo shirt, a second brand associated with the jeans, a third brand associated with the sunglasses, etc. The server 112 may determine the brand using a variety of methods, such as by recognizing a logo, identifying a style of the object or comparing the object to a database of objects using a similarity index. The server 112 may then associate the objects and brands with the first video frame in the annotation data and send the annotation data to the database.

After generating the database of annotation data, the server 112 may use the database to generate maps, charts or other visual representations of data. As illustrated in FIG. 8B, the server 112 may receive (830) filter(s) such as a brand, an object, a time of day, a time of year or the like, may receive (832) a geographic location (e.g., a region) and may generate (834) a map indicating object(s) or brand(s) within the geographic location based on the filter(s). For example, the server 112 may generate a map showing a popularity of a particular style of boots during winter throughout the geographic region. As illustrated in FIG. 8C, the server 112 may receive (850) filter(s) such as a brand, an object, a time of day, a time or year or the like and may generate (852) a chart indicating a popularity of object(s) or brand(s) based on the filters.

Figure 8B:
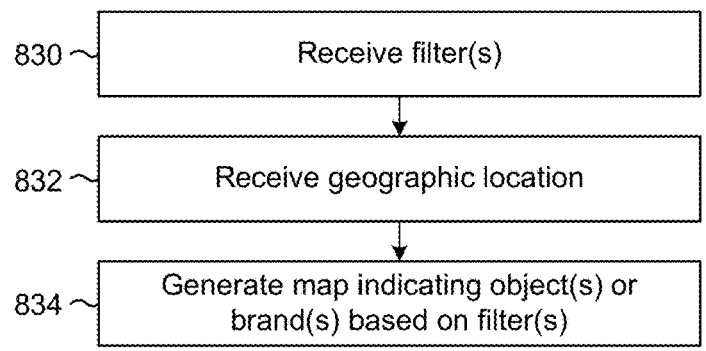
Figure 8C:
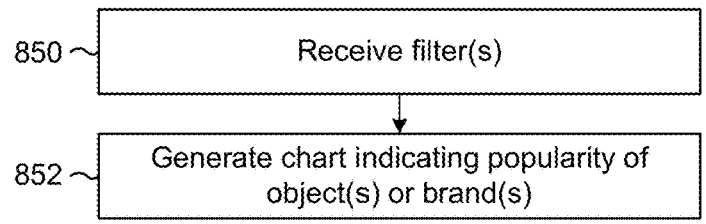

While not illustrated in FIGS. 8A-8C, the present disclosure may include additional functionality enabled by extracting brand information. For example, a video summarization may be generated focused on a particular brand of object (e.g., boots, purse or the like) from amongst video data associated with a plurality of users.

Additional functionality may be enabled by extracting audio information from audio data associated with the video data. For example, the audio data may include music listened to by a user and the identities of the songs may be determined and associated with the user. Additionally or alternatively, the audio data may include songs from media being watched by a user and the identities of the songs may be used to determine the media being watched. For example, a movie soundtrack or a television show soundtrack may include a series of songs. By identifying the songs and determining the songs are in a particular sequence (and a timing associated with the sequence), the server 112 may determine the movie or television show being watched.

Figure 9:
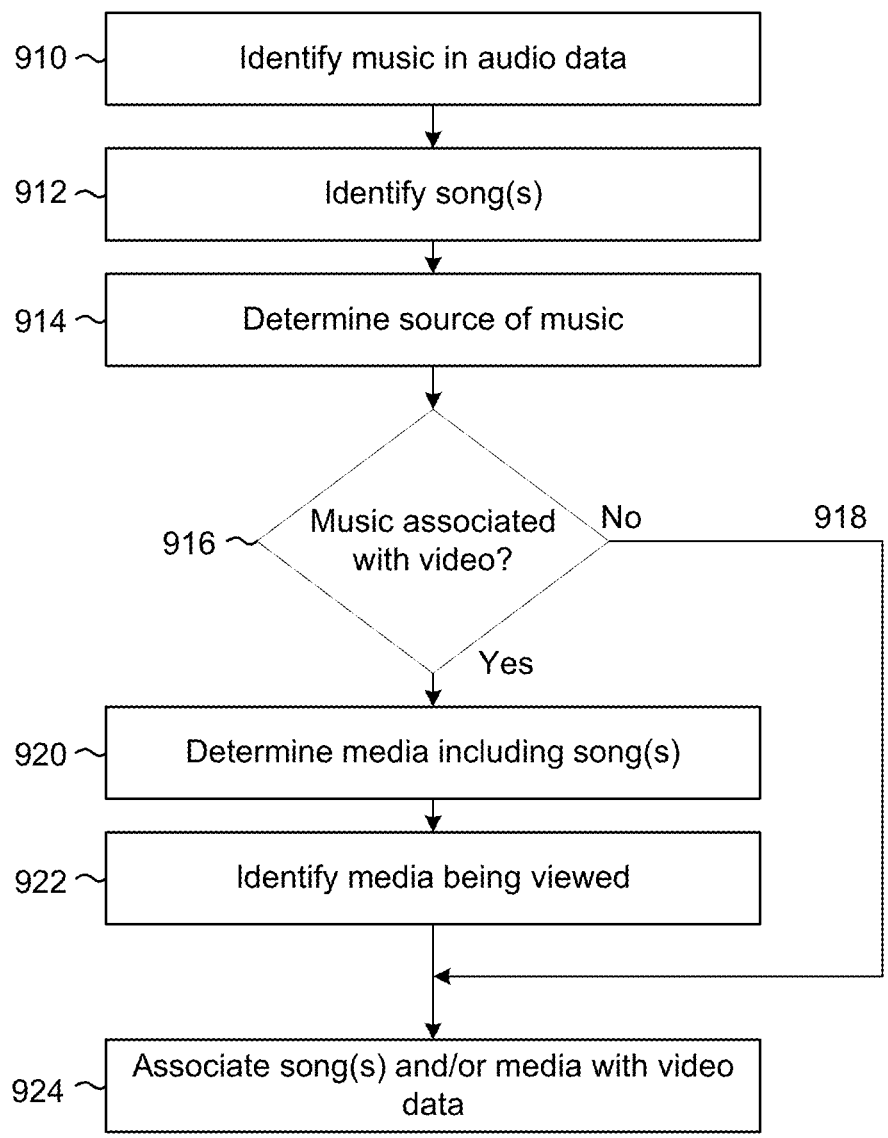
FIG. 9 is a flowchart conceptually illustrating an example method for determining media information from video data according to embodiments of the present disclosure.

FIG. 9 is a flowchart conceptually illustrating an example method for determining media information from video data according to embodiments of the present disclosure. As illustrated in FIG. 9, the server 112 may identify (910) music in audio data associated with the video data and may identify (912) song(s) included in the music. For example, the server 112 may compare an identified song to a database of songs and determine the song based on a similarity index.

In some examples, the server 112 may determine (914) a source of the music, such as determining a direction relative to an image capture device using beamforming of the audio data, or identifying a television or other display in the video data. The server 112 may determine (916) if the music is associated with video, and if it isn't, may loop (918) to step 924. If the music is associated with video, the server 112 may determine (920) media including the song(s) and identify (922) media being viewed in the video data. For example, the server 112 may determine media including the song(s) by acquiring a list of movies, television shows or other media that include the song(s). The server 112 may identify the media being viewed based on a series of identified songs (e.g., identifying multiple songs included in a movie soundtrack), dialogue included in the audio data (e.g., identifying a song included in a movie soundtrack and a character name associated with the movie) or the like. The server 112 may associate (924) the song(s) and/or media with the video data in the annotation data.

Figure 10C:
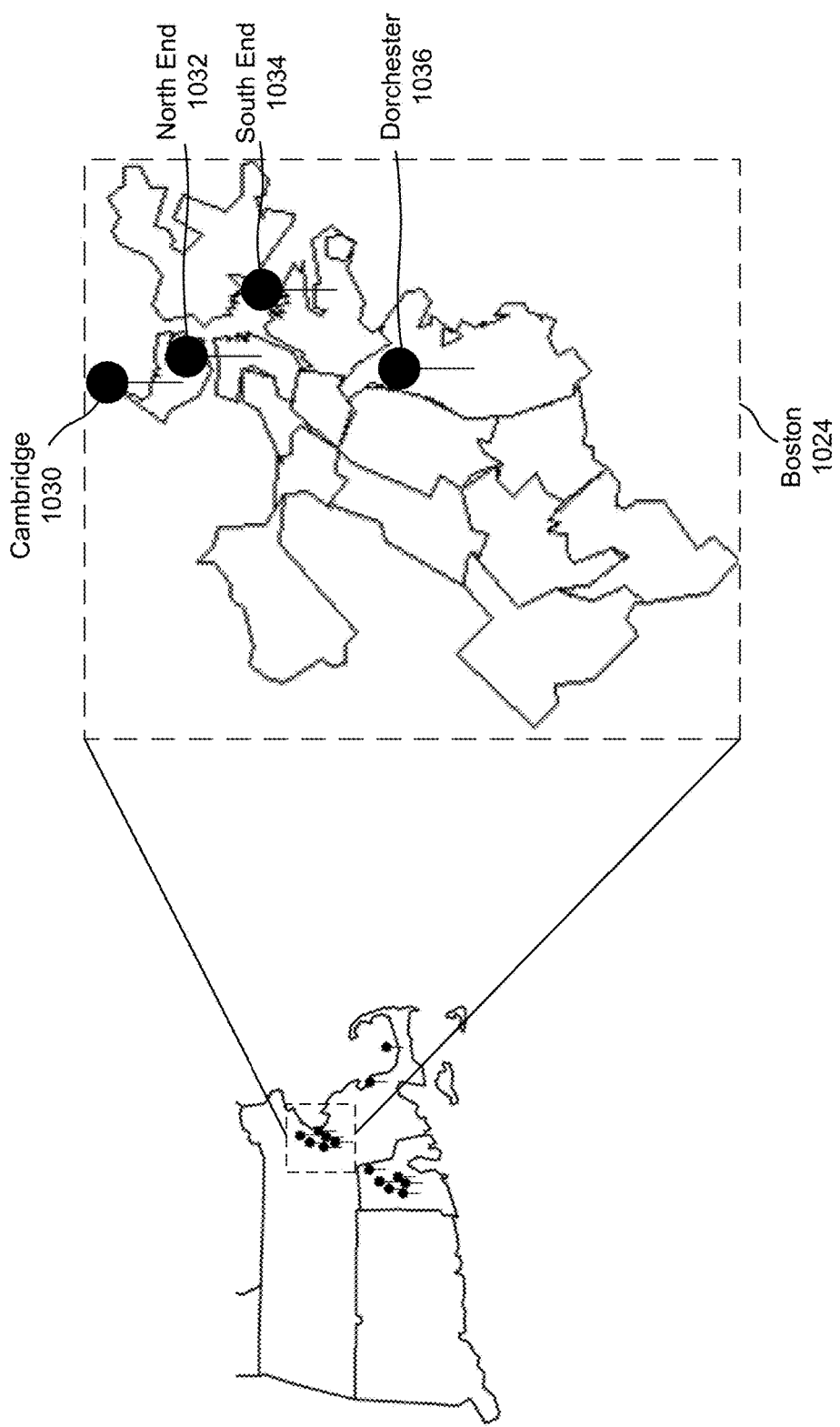

In addition to being included in annotation data, geographic locations may be used to name video data, audio data, image data or the like. However, generic geographic locations don't provide sufficient context to identify particular video data from similarly named video data, while specific geographic locations may not be familiar to a user. Therefore, the server 112 may determine a common term for the geographic location that is specific enough to provide meaning while familiar to the user in order to convey the location. FIG. 10A-10C illustrate examples of geographic annotation data according to embodiments of the present disclosure.

As illustrated in FIG. 10A, locations of video segments 1010 are shown on a map 1000 representing New England. For example, a first grouping of video segments are illustrated in Rhode Island, a second grouping of video segments are illustrated near Boston, a third grouping of video segments are illustrated in New Hampshire and individual video segments are illustrated in Maine and Cape Cod. In generating a common term for the geographic location associated with each of the video segments, the server 112 needs to differentiate between specific locations (e.g., separate locations within an area) while providing a familiar term (e.g., a name commonly recognized instead of GPS coordinates or the like).

As illustrated in FIG. 10B, the server 112 may identify a familiar term for groupings of video segments based on proximity. For example, the server 112 may differentiate video segments associated with New Hampshire 1020, Maine 1022, Boston 1024, Rhode Island 1026 and Cape Cod 1028. While Cape Cod and Boston are both located in Massachusetts, the server 112 may distinguish the grouping in Boston from the isolated video segments in Cape Cod based on a frequency of the geographic location instead of using a common term (e.g., Massachusetts) for both. Thus, the server 112 may determine that the video segments associated with Cape Cod 1028 are separate from the video segments associated with Boston 1024 based on the frequency and may generate a familiar term for each. However, while the server 112 determines a familiar term for the groupings of video segments, the familiar term does not differentiate between specific locations within the grouping.

As illustrated in FIG. 10C, the server 112 may identify specific locations for individual video segments associated with a broader grouping. For example, video segments associated with Boston 1024 may be further differentiated by regions within Boston 1024, such as Cambridge 1030, North End 1032, South End 1034 and Dorchester 1036. While not illustrated in FIG. 10C, the server 112 may identify even more specific locations based on a number of video segments associated with a particular geographic region. For example, multiple video segments may be captured within proximity to a user's home in Cambridge 1030. Instead of identifying each of the video segments with Cambridge 1030, the server 112 may identify distinct locations within Cambridge such as individual points of interest, such as restaurants, parks, sporting venues, or previous identification input from the user (e.g., "Steve's house").

Figure 11B:
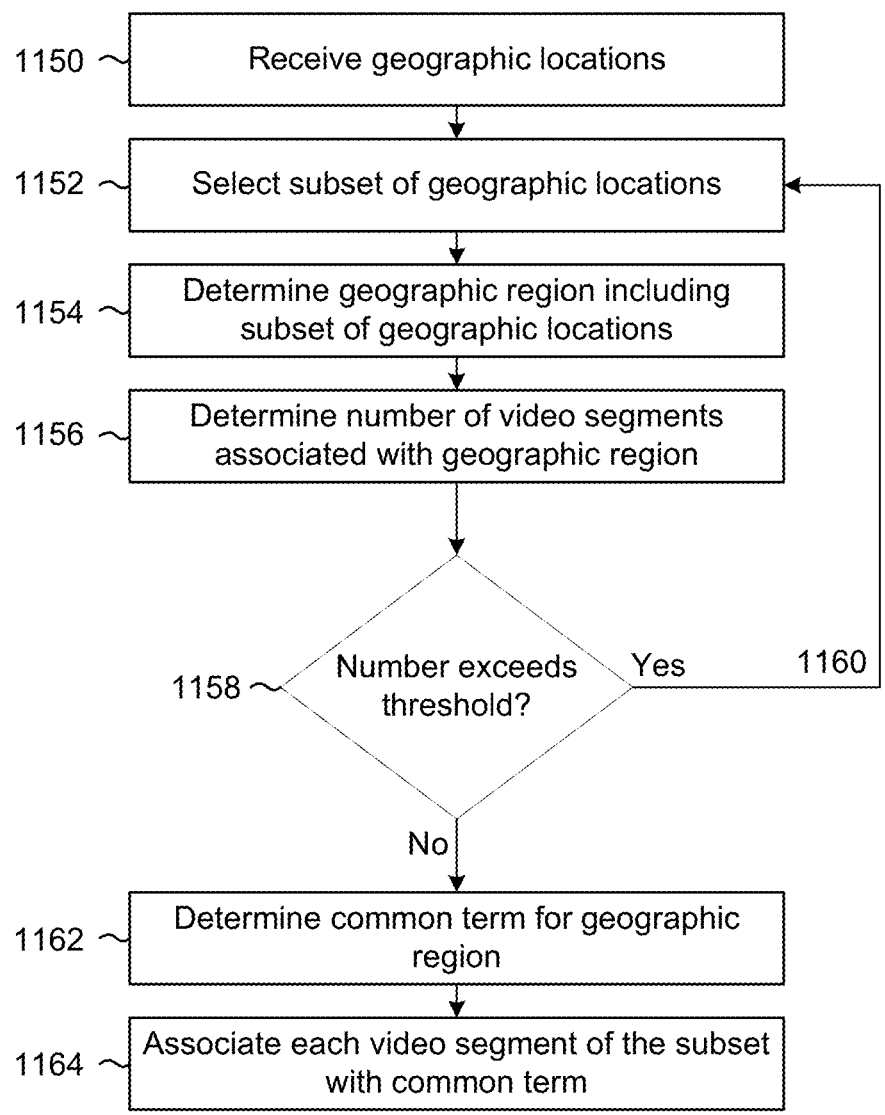

FIG. 11A-11B are flowcharts conceptually illustrating example methods for determining a geographic description for annotation data according to embodiments of the present disclosure. As illustrated in FIG. 11A, the server 112 may determine (1110) if the user has been to a continent before and if not, may associate (1112) the video data with the continent name. The server 112 may determine (1114) if the user has been to a country before and if not, may associate (1116) the video data with the country name. The server 112 may determine (1118) if the user has been to a region before and if not, may associate (1120) the video data with the region name. The server 112 may determine (1122) if the user has been to a city/town before and if not, may associate (1124) the video data with the city/town name. The server 112 may determine (1126) if there is a point of interest nearby and if so, may associate (1128) the video data with the point of interest. The server 112 may determine (1130) if there is a named location (e.g., restaurant, company, etc.) associated with the geographic location and if so, may associate (1132) the video data with a name of the location. The server 112 may determine (1134) if the geographic location is associated with a user identified location and if so, may associate (1136) the video data with the user identification. In addition to identifications created previously by the user, the server 112 may include identifications created by other users based on user preferences. In some examples, the server 112 may include identifications created previously by friends of the user (determined using a social networking database, user preferences or the like), while in other examples the server 112 may include identifications created previously by any user. Finally, the server 112 may determine (1138) if an address is available for the geographic location and if so, may associate (1140) the video data with an abbreviation of the address. If an address is not available, the server 112 may associate (1142) the video data with GPS coordinates.

FIG. 11B illustrates an alternative way of determining a geographic description. As illustrated in FIG. 11B, the server 112 may receive (1150) geographic locations associated with a user, may select (1152) a subset of the geographic locations (e.g., geographic locations associated with selected video segments) and may determine (1154) a geographic region including the subset of geographic locations. The server 112 may determine (1156) a number of video segments associated with the geographic region and may determine (1158) if the number exceeds a threshold. If the number exceeds the threshold, the server 112 may loop (1160) to step 1152 to refine the subset. If the number is below the threshold, the server 112 may determine (1162) a common term for the geographic region and may associate (1164) each video segment included in the subset with the common term. Thus, the server 112 may compare the number of video segments associated with the geographic region to the overall geographic locations associated with the user to determine a degree of granularity required to identify the geographic region with specificity and familiarity.

FIG. 12 illustrates a block diagram conceptually illustrating example components of a system 100 including one or more of a device 102 and a server 112. Certain components illustrated in FIG. 12 may also be included in an image capture device 110. Depending upon how the system is structured, some of the components illustrated in FIG. 12 as part of the device 102 or the server 112 may be included only in the device 102 or in the server 112, or may be distributed across multiple devices 102 and/or servers 112. Other components not illustrated may also be included in the device 102, image capture device 110 and/or the server 112. In operation, the system 100 may include computer-readable and computer-executable instructions that reside in storage 1208 on the device 102/server 112. The device 102/server 112 may be an electronic device capable of performing facial recognition and/or video editing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 112 may also be a component of any of the abovementioned devices or systems.

As illustrated in FIG. 12, the device 102/server 112 may include an address/data bus 1202 for conveying data among components of the device 102. Each component within the device 102/server 112 may also be directly connected to other components in addition to (or instead of) being connected to other components across the bus 1202.

The device 102/server 112 may include one or more controllers/processors 1204 comprising one-or-more central processing units (CPUs) for processing data and computer-readable instructions and a memory 1206 for storing data and instructions. The memory 1206 may include volatile random access memory (RAM), non-volatile read only memory (ROM), non-volatile magnetoresistive (MRAM) and/or other types of memory. The device 102/server 112 may also include a data storage component 1208 for storing data and processor-executable instructions. The data storage component 1208 may include one or more non-volatile storage types such as magnetic storage, optical storage, solid-state storage, etc. The device 102/server 112 may also be connected to a removable or external non-volatile memory and/or storage (such as a removable memory card, memory key drive, networked storage, etc.) through the input/output device interfaces 1210.

The device 102/server 112 includes input/output device interfaces 1210. A variety of components may be connected to the device 102/server 112 through the input/output device interfaces 1210, such as camera(s) and microphone(s). However, the disclosure is not limited thereto and the device 102/server 112 may not include an integrated camera or microphone. Thus, the camera(s), microphone(s) and/or other components may be integrated into the device 102 or may be separate without departing from the disclosure.

The input/output device interfaces 1210 may be configured to operate with a network 1220, for example a wireless local area network (WLAN) (such as WiFi), Bluetooth, zigbee and/or wireless networks, such as a Long Term Evolution (LTE) network, WiMAX network, 3G network, etc. The network 1220 may include a local or private network or may include a wide network such as the internet. Devices may be connected to the network 1220 through either wired or wireless connections.

The input/output device interfaces 1210 may also include an interface for an external peripheral device connection such as universal serial bus (USB), FireWire, Thunderbolt, Ethernet port or other connection protocol that may connect to networks 1220. The input/output device interfaces 1210 may also include a connection to an antenna (not shown) to connect one or more networks 1220 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server 112 further includes an annotation module 1224, which may comprise processor-executable instructions stored in storage 1208 to be executed by controller(s)/processor(s) 1204 (e.g., software, firmware), hardware, or some combination thereof. For example, components of the annotation module 1224 may be part of a software application running in the foreground and/or background on the device 102/server 112. The annotation module 1224 may control the device 102/server 112 as discussed above, for example with regard to FIGS. 1, 4, 7, 8A-8C, 9 and/or 11A-11B. Some or all of the controllers/modules of the annotation module 1224 may be executable instructions that may be embedded in hardware or firmware in addition to, or instead of, software. In one embodiment, the device 102/server 112 may operate using an Android® operating system (such as Android® 4.3 Jelly Bean, Android® 4.4 KitKat or the like) or an Amazon® operating system (such as FireOS or the like).

Executable computer instructions for operating the device 102/server 112 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

The components of the device(s) 102/server 112, as illustrated in FIG. 12, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 13:
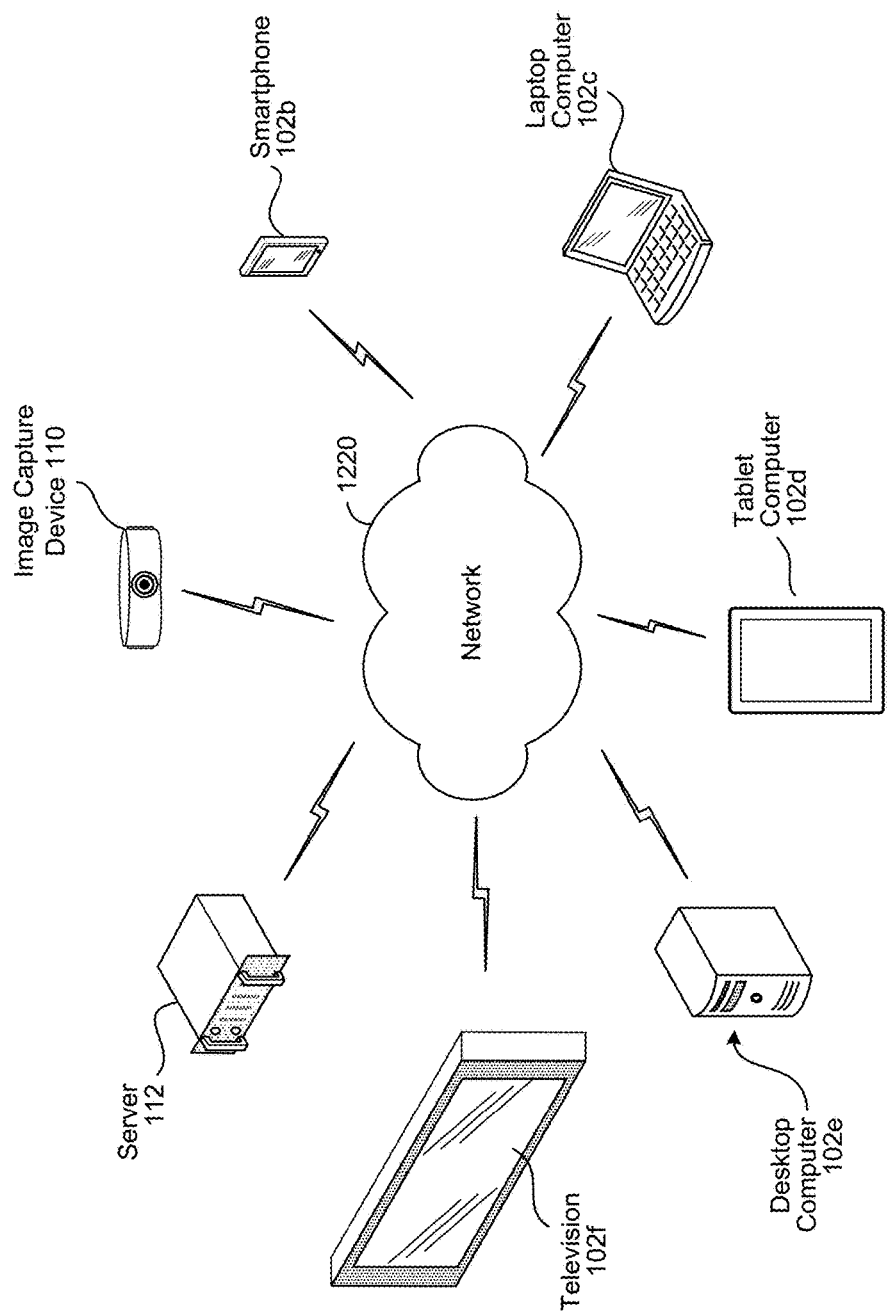
FIG. 13 illustrates an example of a computer network for use with the system.

As shown in FIG. 13, multiple devices may be connected over a network 1220. The network 1220 may include a local or private network or may include a wide network such as the internet. Devices may be connected to the network 1220 through either wired or wireless connections. For example, a smart phone 102b may be connected to the network 1220 through a wireless service provider. Other devices, such as an image capture device 110, laptop computer 102c, tablet computer 102d, desktop computer 102e, television 102f, and/or server 112, may connect to the network 1220 through a wired connection. The server 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server 112 may perform any of the steps described above with regard to FIGS. 1, 6, and/or 9A-9C. Alternatively, the server 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving video data;
   determining that a first video frame of the video data includes a first representation of a first face and a second representation of a second face;
   determining first image data including the first representation of the first face;
   determining second image data including the second representation of the second face, the second image data corresponding to the first video frame of the video data;
   determining a distance between the first representation and the second representation;
   determining that the distance exceeds a distance threshold;
   based at least in part on determining that the distance exceeds the distance threshold, creating a second video frame including the first image data and the second image data, but not including a portion of intervening space, wherein the intervening space is between the first image data and the second image data in the first video frame; and
   generating a video summarization including the video data and the second video frame.

2. The computer-implemented method of claim 1, further comprising:
    identifying at least one face represented in a third video frame of the video data;
    identifying at least one object represented in the third video frame;
    determining a geographic location associated with the third video frame;
    determining motion data associated with the third video frame;
    determining a scene associated with the third video frame;
    determining an existence of speech in audio data associated with the third video frame; and
    associating the at least one face, the at least one object, the geographic location, the motion data, the scene and the existence of speech with the third video frame.

3. The computer-implemented method of claim 1, further comprising:
    determining that a characteristic is represented in a third video frame of the video data;
    determining a first priority metric to be associated with the third video frame; and
    associating the first priority metric with the video data.

4. The computer-implemented method of claim 1, further comprising:
    receiving audio data associated with a third video frame;
    identifying music included in the audio data;
    determining a title of a song corresponding to the music; and
    associating the song with the first video frame.

5. The computer-implemented method of claim 1, further comprising:
    receiving a first geographic location associated with the video data;
    determining a geographic region including the first geographic location;
    determining a frequency of the geographic region in the video data;
    determining that the frequency is below a threshold;
    determining a common term for the geographic region; and
    associating the common term with the video data.

6. The computer-implemented method of claim 1, further comprising:
    receiving a first geographic location associated with the video data;
    determining a geographic region including the first geographic location;
    determining a frequency of the geographic region in the video data;
    determining that the frequency exceeds a threshold;
    determining a first specific term for the first geographic location; and
    associating the first specific term with the video data.

7. A system, comprising:
    at least one processor and a memory including instructions operable to be executed by the at least one processor to configure the system to perform:
        receiving video data;
        determining that a first video frame of the video data includes a first representation of a first face and a second representation of a second face;
        determining first image data including the first representation of the first face;
        determining second image data including the second representation of the second face, the second image data corresponding to the video frame;
        determining a distance between the first representation and the second representation;
        determining that the distance exceeds a distance threshold;
        based at least in part on determining that the distance exceeds the distance threshold, creating a second video frame including the first image data and the second image data, but not including a portion of intervening space, wherein the intervening space is between the first image data and the second image data in the first video frame;
        generating a video summarization including the video data and the second video frame.

8. The system of claim 7, wherein the instructions further configure the system to perform:
    identifying at least one face represented in a third video frame of the video data;
    identifying at least one object represented in the third video frame;
    determining a geographic location associated with the third video frame;
    determining motion data associated with the third video frame;
    determining a scene associated with the third video frame;
    determining an existence of speech in audio data associated with the third video frame; and
    associating the at least one face, the at least one object, the geographic location, the motion data, the scene and the existence of speech with the third video frame.

9. The system of claim 7, wherein the instructions further configure the system to perform:
    determining that a characteristic is represented in a third video frame of the video data;
    determining the priority metric to be associated with the third video frame; and
    associating the first priority metric with the video data.

10. The system of claim 7, wherein the instructions further configure the system to perform:
    receiving audio data associated with a third video frame;
    identifying music included in the audio data;
    determining a title of a song corresponding to the music; and
    associating the song with the video frame.

11. The system of claim 7, wherein the instructions further configure the system to perform:
    receiving a first geographic location associated with the video data;
    determining a geographic region including the first geographic location;
    determining a frequency of the geographic region in the video data;
    determining that the frequency is below a threshold;
    determining a common term for the geographic region; and
    associating the common term with the video data.

12. The system of claim 7, wherein the instructions further configure the system to perform:
    receiving a first geographic location associated with the video data;
    determining a geographic region including the first geographic location;
    determining a frequency of the geographic region in the video data;
    determining that the frequency exceeds a threshold;
    determining a first specific term for the first geographic location; and
    associating the first specific term with the video data.

13. The computer-implemented method of claim 1, wherein creating the second video frame comprises creating a cropped window or a split screen.

14. The system of claim 7, wherein creating the second video frame comprises creating a cropped window or a split screen.

15. The computer-implemented method of claim 1, further comprising, prior to determining the first video frame,
  determining that a third video frame of the video data includes a third representation of the first face and a fourth representation of the second face;
  determining third image data including the third representation of the first face
  determining fourth image data including the fourth representation of the second face;
  determining a second distance, within the third video frame, between the third representation and the fourth representation; and
  determining that the second distance is less than the distance threshold.

16. The system of claim 7, wherein the instructions further configure the system, prior to determining the first video frame, to perform:
  determining that a third video frame of the video data includes a third representation of the first face and a fourth representation of the second face;
  determining third image data including the third representation of the first face
  determining fourth image data including the fourth representation of the second face;
  determining a second distance, within the third video frame, between the third representation and the fourth representation; and
  determining that the second distance is less than the distance threshold.

17. The computer-implemented method of claim 1, further comprising:
  determining first pixel coordinates corresponding to the first representation; and
  determining second pixel coordinates corresponding to the second representation,
  wherein determining the distance comprises determining a number of pixels between the first pixel coordinates and the second pixel coordinates.

18. The system of claim 7, wherein the instructions further configure the system to perform:
  determining first pixel coordinates corresponding to the first representation; and
  determining second pixel coordinates corresponding to the second representation,
  wherein determining the distance comprises determining a number of pixels between the first pixel coordinates and the second pixel coordinates.

* * * * *